(12) United States Patent
Treacy, Jr. et al.

(10) Patent No.: US 12,076,903 B2
(45) Date of Patent: Sep. 3, 2024

(54) SCREW ELEMENTS FOR EXTRUSION APPARATUS AND METHODS OF MANUFACTURING A HONEYCOMB BODY

(71) Applicant: CORNING INCORPORATED, Corning, NY (US)

(72) Inventors: David Robertson Treacy, Jr., Beaver Dams, NY (US); Conor James Walsh, Campbell, NY (US); Stephanie Stoughton Wu, Cambridge, MA (US)

(73) Assignee: Corning Incorporated, Corning, NY (US)

( * ) Notice: Subject to any disclaimer, the term of this patent is extended or adjusted under 35 U.S.C. 154(b) by 549 days.

(21) Appl. No.: 16/753,378

(22) PCT Filed: Oct. 3, 2018

(86) PCT No.: PCT/US2018/054086
§ 371 (c)(1),
(2) Date: Apr. 3, 2020

(87) PCT Pub. No.: WO2019/070797
PCT Pub. Date: Apr. 11, 2019

(65) Prior Publication Data
US 2020/0276745 A1 Sep. 3, 2020

Related U.S. Application Data

(60) Provisional application No. 62/568,508, filed on Oct. 5, 2017.

(51) Int. Cl.
*B29C 48/11* (2019.01)
*B29C 48/40* (2019.01)
(Continued)

(52) U.S. Cl.
CPC .............. *B29C 48/11* (2019.02); *B29C 48/40* (2019.02); *B29C 48/022* (2019.02); *B29C 48/30* (2019.02);
(Continued)

(58) Field of Classification Search
CPC ......... B29C 48/11; B29C 48/40; B29C 48/30; B29C 48/535; B29B 7/482
See application file for complete search history.

(56) References Cited

U.S. PATENT DOCUMENTS 3,300,810 A * 1/1967 Gregory .................. B29C 48/56
366/82
4,040,607 A 8/1977 Ullrich
(Continued)

FOREIGN PATENT DOCUMENTS

EP 2233265 A2 9/2010
GB 1167850 A 10/1969
(Continued)

OTHER PUBLICATIONS

International Search Report and Written Opinion of the International Searching Authority; PCT/US2018/054086; Mailed Mar. 13, 2019; 17 Pages; European Patent Office.

*Primary Examiner* — Monica A Huson
*Assistant Examiner* — Kelsey C Grace
(74) *Attorney, Agent, or Firm* — Daniel J. Greenhalgh

(57) ABSTRACT

Screw elements, extrusion apparatus, and methods of manufacturing honeycomb bodies are described herein. A segment for a ceramic batch screw extruder machine has at least one pump and mix screw element. The pump and mix screw element has a pitch, a diameter, and a pitch to diameter ratio of 0.8 to 2.6.

17 Claims, 17 Drawing Sheets

(51) Int. Cl.
　　　*B29C 48/00*　　　(2019.01)
　　　*B29C 48/30*　　　(2019.01)
　　　*B29C 48/535*　　(2019.01)
　　　*B29L 31/60*　　　(2006.01)

(52) U.S. Cl.
　　　CPC ...... *B29C 48/535* (2019.02); *B29C 2948/926* (2019.02); *B29L 2031/60* (2013.01)

(56) References Cited

U.S. PATENT DOCUMENTS

| | | | |
|---|---|---|---|
| 4,129,386 A * | 12/1978 | Rauwendaal | B29C 48/686 366/89 |
| 5,573,332 A | 11/1996 | Weihrich et al. | |
| 6,663,378 B2 | 12/2003 | Grover et al. | |
| 7,101,166 B2 | 9/2006 | Yamaguchi et al. | |
| 9,174,357 B2 | 11/2015 | Yamazaki | |
| 2004/0164464 A1 | 8/2004 | Lubberts et al. | |
| 2005/0041521 A1 | 2/2005 | Rainer | |
| 2005/0233667 A1 | 10/2005 | Hobart | |
| 2006/0118989 A1 * | 6/2006 | Shinbach | B29C 48/297 264/102 |
| 2009/0213683 A1 | 8/2009 | Fukutani et al. | |
| 2010/0052206 A1 | 3/2010 | Kerr et al. | |
| 2010/0244309 A1 | 9/2010 | Hayashi et al. | |
| 2011/0158039 A1 * | 6/2011 | Bierdel | B29B 7/483 366/301 |
| 2011/0160381 A1 | 6/2011 | Koenig et al. | |
| 2012/0135098 A1 | 5/2012 | Walsh | |
| 2013/0259966 A1 | 10/2013 | Blach | |
| 2014/0306370 A1 | 10/2014 | Dispenza et al. | |
| 2015/0108680 A1 | 4/2015 | Beecher et al. | |
| 2016/0289123 A1 | 10/2016 | McCauley et al. | |
| 2017/0136426 A1 * | 5/2017 | Bierdel | B29B 7/482 |

FOREIGN PATENT DOCUMENTS

| | | |
|---|---|---|
| JP | 09164579 A | 6/1997 |
| JP | 2002-283918 A | 10/2002 |
| JP | 4100004 B2 | 6/2008 |
| UA | 15853 U | 7/2006 |
| WO | 2016069573 A1 | 5/2016 |

* cited by examiner

End of Log Tilt Mechanism

1. As batch exits the die, it wants to flow faster in the 4 o'clock and the 10 o'clock positions (due to temperature or shear profile of the batch and screw discharge patterns)
2. If the log were free to deform, this would cause the fast flow areas to "curl in" and deform yielding tilt
3. But the extrudate is constrained and cannot deform, so instead a stress builds up
4. As soon as the log is cut, the stress is released near the ends of the log and so the ends deform causing tilt

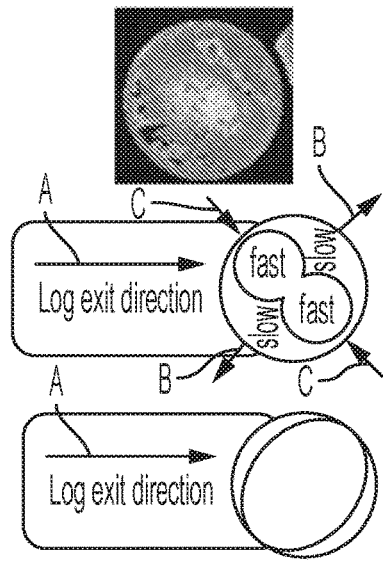

FIG. 6

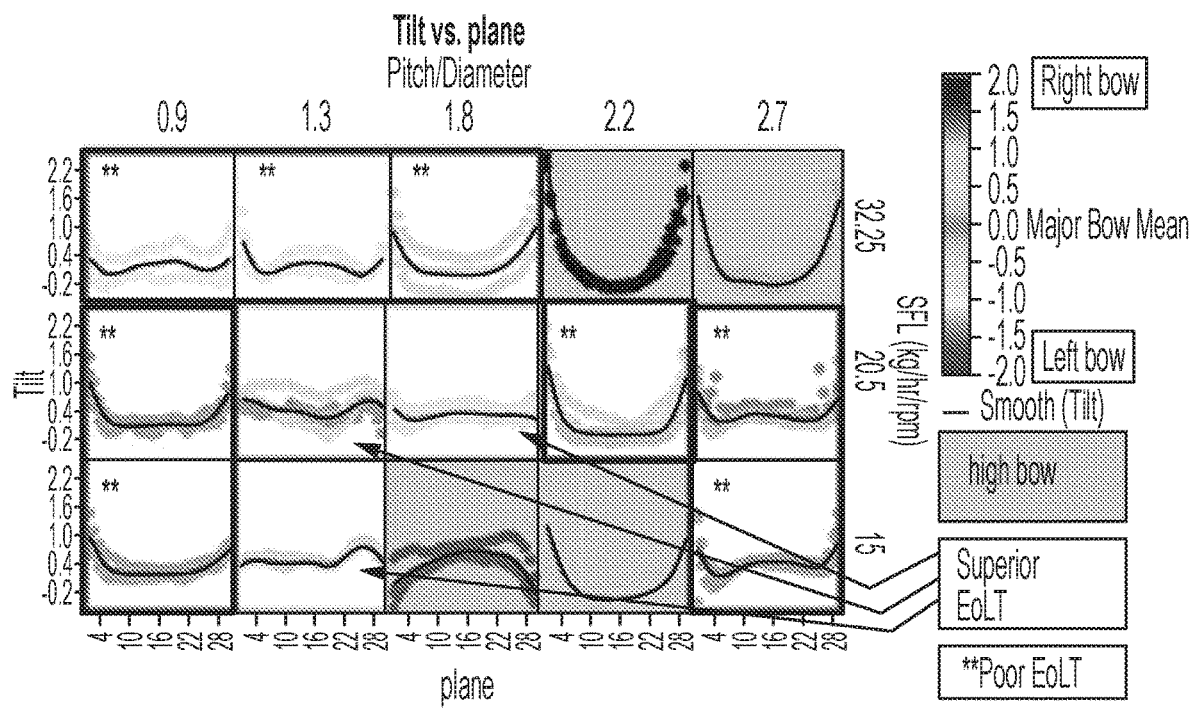

FIG. 7

Equation 1

$$\tan \alpha = \frac{\pi d}{p}$$

Equation 2

$$f_a = F(\sin \alpha)$$
$$f_r = F(\cos \alpha)$$

SCREW ELEMENTS FOR EXTRUSION APPARATUS AND METHODS OF MANUFACTURING A HONEYCOMB BODY

CROSS-REFERENCE TO RELATED APPLICATIONS

This application is a National Stage application under 35 U.S.C. § 371 of International Application No. PCT/US2018/054086 filed on Oct. 3, 2018 which claims the benefit of priority under 35 U.S.C. § 119 of U.S. Provisional Application Ser. No. 62/568,508, filed on Oct. 5, 2017, the contents of which are relied upon and incorporated herein by reference in their entireties. The present application is related to U.S. Provisional Application Ser. No. 62/568,504, filed Oct. 5, 2017, entitled "KNEADING ELEMENTS FOR EXTRUSION APPARATUS AND METHODS OF MANUFACTURING A HONEYCOMB BODY," which is hereby incorporated by reference herein in its entirety.

FIELD

Exemplary embodiments of the present disclosure are directed to elements for extruding ceramic batch materials and, in particular, screw elements for extruding batch materials.

BACKGROUND

The manufacture of ceramic honeycomb structures may be accomplished by the process of extruding ceramic powder batch mixtures through honeycomb extrusion dies to form honeycomb extrudate, and drying and firing the extrudate to produce ceramic honeycombs of high strength and thermal durability. The ceramic honeycombs thus produced can be used as catalytic substrates or filters for engine exhaust after treatment.

SUMMARY

Illustrative embodiments of the present disclosure are directed to a segment for a ceramic batch screw extruder machine. The segment comprises at least one pump and mix screw element. The pump and mix screw element comprises a pitch, a diameter, and a pitch to diameter ratio of 0.8 to 2.6.

In some embodiments, the at least one pump and mix screw element comprises a pitch to diameter ratio of 0.9 to 2.2.

In some embodiments, the at least one pump and mix screw element comprises a pitch to diameter ratio of 1.2 to 1.9.

In some embodiments, the at least one pump and mix screw element comprises a pitch to diameter ratio of 0.8 to 1.0.

In some embodiments, the at least one pump and mix screw element is a single flight element.

In some embodiments, (i) the at least one pump and mix screw element comprises a plurality of pump and mix screw elements, and (ii) each of the plurality of pump and mix screw elements comprises the same pitch to diameter ratio.

In some embodiments, (i) the at least one pump and mix screw element comprises a plurality of pump and mix screw elements, and (ii) at least one of the plurality of pump and mix screw elements comprises a different pitch to diameter ratio than at least one other of the plurality of pump and mix screw elements.

Illustrative embodiments of the present disclosure are also directed to a ceramic batch screw extruder machine. The machine comprises at least one barrel; a shaft disposed at least partially within the at least one barrel; and a segment disposed along the shaft and the segment comprising at least one pump and mix screw element. The pump and mix screw element comprises a pitch, a diameter, and a pitch to diameter ratio of 0.8 to 2.6.

In some embodiments, the segment is disposed at least partially in a backup length region of the extruder.

In some embodiments, the machine further comprises at least one kneading element disposed on the shaft.

In some embodiments, the machine further comprises at least one kneading element disposed on the shaft downstream of the at least one pump and mix screw element.

In some embodiments, (i) the machine further comprises at least one kneading element disposed on the shaft downstream of the at least one pump and mix screw element, and (ii) the at least one kneading element comprises a single lobe continuous closed curve elliptical geometry.

In some embodiments, the at least one kneading element comprises a plurality of kneading elements.

In some embodiments, (i) the at least one kneading element comprises a single lobe continuous closed curve eccentric elliptical geometry, (ii) the at least one pump and mix screw element comprises a plurality of pump and mix screw elements, and (iii) a first portion of the plurality of pump and mix screw elements are disposed upstream of the at least one kneading element and a second portion of the plurality of pump and mix screw elements are disposed downstream of the at least one kneading element.

In some embodiments, (i) the at least one kneading element comprises a plurality of kneading elements and (ii) each kneading element is disposed at an angle of 80° to 100° offset to any adjacent kneading element.

In some embodiments, (i) the at least one kneading element comprises a plurality of kneading elements and (ii) each kneading element is disposed at an angle of 35° to 55° offset to any adjacent kneading element.

In some embodiments, the at least one kneading element comprises a plurality of kneading elements and (ii) each kneading element is disposed at an angle of 35° to 180° offset to any adjacent kneading element.

In some embodiments, the at least one kneading element comprises four to eight kneading elements.

In some embodiments, (i) the ceramic batch screw extruder machine comprises a 75 to 100 mm extruder diameter, (ii) the first portion of the plurality of pump and mix screw elements comprises at least one of 120 mm pitch and 160 mm pitch elements, and (iii) the second portion of the plurality of pump and mix screw elements comprises at least one of 120 mm and 160 mm pitch elements.

In some embodiments, (i) the ceramic batch screw extruder machine comprises a 100 to 150 mm extruder diameter, (ii) the first portion of the plurality of pump and mix screw elements comprises at least one of 180 mm pitch and 240 mm pitch elements, and (iii) the second portion of the plurality of pump and mix screw elements comprises at least one of 180 mm and 240 mm pitch elements.

In some embodiments, (i) the ceramic batch screw extruder machine comprises a 100 to 150 mm extruder diameter, (ii) the first portion of the plurality of pump and mix screw elements comprises at least one of 240 mm pitch and 320 mm pitch elements, and (iii) the second portion of the plurality of pump and mix screw elements comprises at least one of 240 mm and 320 mm pitch elements.

In some embodiments, the machine further comprises at least one 80 mm pitch element upstream of the first portion of the plurality of pump and mix screw elements.

Illustrative embodiments of the present disclosure are further directed to a method of making a honeycomb body. The method comprises pumping and mixing ceramic batch in a screw extruder machine and extruding the batch through a die to form the honeycomb body. The extruder comprises mix screw element comprising a pitch, a diameter, and a pitch to diameter ratio of 0.9 to 2.2.

BRIEF DESCRIPTION OF THE DRAWINGS

The accompanying drawings, which are included to provide a further understanding of the disclosure and are incorporated in and constitute a part of this specification, illustrate exemplary embodiments of the disclosure, and together with the description serve to explain the principles of the disclosure.

FIG. 6 is a schematic of ceramic batch as it exits a die.

FIG. 7 shows end of log tilt reduction for tested screw configurations according to some exemplary embodiments of the disclosure.

DETAILED DESCRIPTION OF THE ILLUSTRATED EMBODIMENTS

Figure 1:
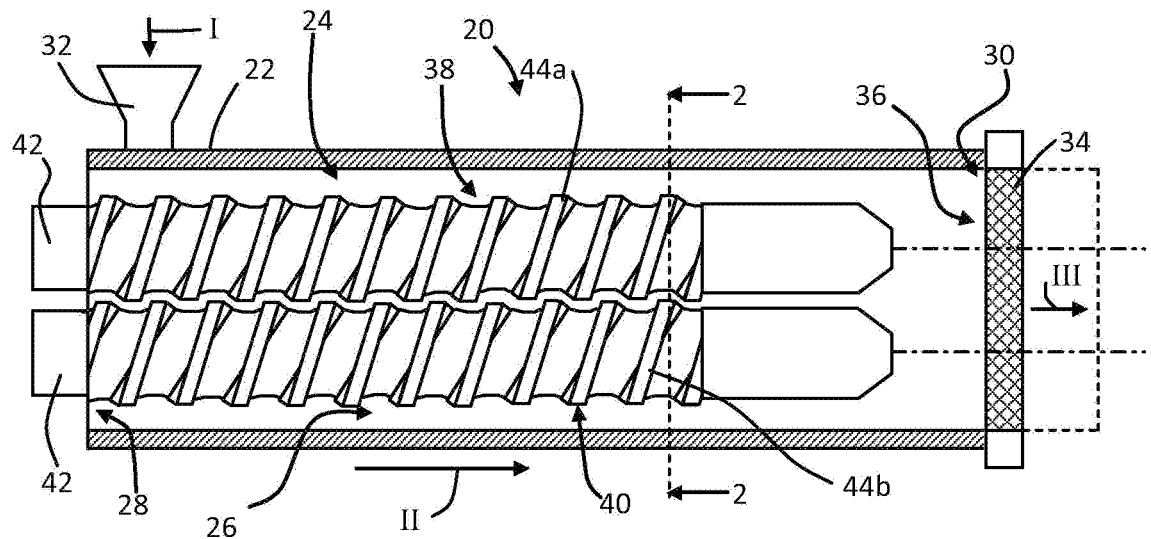
FIG. 1 is a schematic diagram of a twin screw extruder machine (TSM) according to one exemplary embodiment of the disclosure.

The disclosure is described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure is thorough, and will fully convey the scope of the disclosure to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Exemplary embodiments of the present disclosure relate to screw segments for extrusion apparatus and methods of manufacturing a honeycomb body. As used herein honeycomb structure refers to honeycomb extrudate, whether wet, dry, green, fired, cut, contoured, plugged, skinned, porous, catalyzed, or the like, including honeycomb segments and honeycomb bodies.

The manufacture of porous ceramic honeycomb bodies may be accomplished by the process of plasticizing ceramic powder batch mixtures, extruding the mixtures through honeycomb extrusion dies to form honeycomb extrudate, and cutting, drying, and firing the extrudate to produce ceramic honeycomb bodies of high strength and thermal durability having channels defined by intersecting walls extending axially from a first end face to a second end face. In this sense, ceramic powder batch mixtures, ceramic pre-cursor batches, ceramic batch, or ceramic batch compositions may comprise inorganic oxides or oxide precursors that when reacted form a ceramic, as well as ceramics that remain unreacted or react to form another ceramic in whole or in part.

Upon exiting the extruder in an axial direction, the batch stiffens into a wet extrudate comprising a network of axially extending intersecting walls (webs) that form axially extending channels and an axially extending outer peripheral surface. The webs and channels comprise a matrix. Disposed at the outer periphery of the matrix is the outer peripheral surface. The outer peripheral surface may be referred to herein as a co-extruded skin, an integrally formed co-extruded skin, or skin. A greenware honeycomb body or porous ceramic honeycomb body extruded with the skin on the matrix is referred to herein as an extrude-to-shape honeycomb body. As used herein a ceramic honeycomb body includes ceramic honeycomb monoliths and ceramic segmented honeycomb bodies.

A co-extruded or an after-applied exterior skin may form an outer peripheral surface extending axially from a first end face to a second end face of the ceramic honeycomb body. Each channel of the honeycomb body defined by intersecting walls (webs) can be plugged at an inlet face or an outlet face to produce a filter. When some channels are left unplugged a partial filter can be produced. The honeycomb body can be catalyzed to produce a substrate. A non-plugged honeycomb body is generally referred to herein as a substrate. The catalyzed substrate can have an after applied catalyst or comprise an extruded catalyst. Further, filters and partial filters can be catalyzed to provide multi-functionality. The ceramic honeycomb bodies thus produced are widely used as catalyst supports, membrane supports, wall-flow filters, partial filters, and combinations thereof for cleaning fluids such as purifying engine exhausts.

Porous ceramic honeycomb bodies may be made of aluminum titanate based materials such as aluminum titanate solid solution (pseudobrookite), silicon carbide, cordierite, feldspar, mullite, spinel, alumina, rutile, corundum, or similar oxides, or other oxide or non-oxide ceramics, including metals, intermetallics, glasses, zircon, alkali and alkaline-earth alumino-silicates, perovskites, zirconia, ceria, yttria, lanthanum oxide, silicon oxide ($SiO_2$), silicon nitride ($Si_3N_4$), silicon aluminum oxynitride (SiAlON), zeolites, and combinations thereof.

Figure 2:
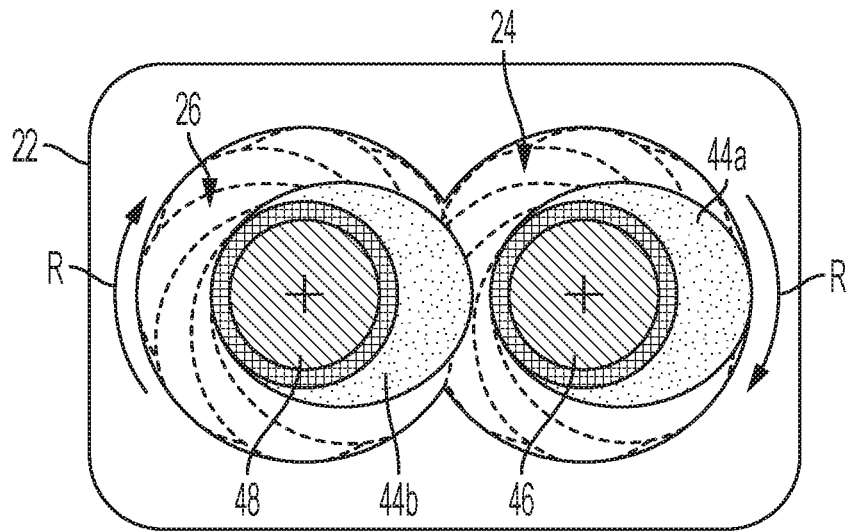
FIG. 2 is a front sectional schematic view taken along line 2-2 of FIG. 1.

FIG. 1 depicts an exemplary embodiment of a continuous twin-screw extruder machine (TSM) 20. The twin-screw extruder machine 20 includes a barrel 22 including a pair of chambers 24, 26 formed therein and in communication with each other (see also FIG. 2). The barrel 22 can be monolithic, or can be formed from a plurality of barrel segments connected successively in a longitudinal (i.e., axial) direction. The chambers 24, 26 extend in the longitudinal direction from an upstream side 28 to a downstream side 30 the barrel 22. As used herein, the term "downstream" refers to the direction in which the batch flows within the barrel 22 (as called out in FIG. 1 by I, II, and III). The term "upstream" refers to a direction that is opposite to the direction in which the batch flows through the barrel 22. At the upstream side 28 of the barrel 22, a material supply port 32, which can include a hopper or other material supply structure, is provided for supplying the batch material to the extruder 20. An extrusion die 34 is provided at a discharge port 36 at the downstream side 30 of the barrel 22 for extruding the batch material into a desired shape, such as a honeycomb article or the like. The extrusion die 34 can be coupled with respect to the discharge port 36 of the barrel 22, such as at an end of the barrel 22. The extrusion die 34 can be preceded by other structure, such as a generally open cavity (not shown), screen/homogenizer (not shown), or the like to facilitate the formation of a steady plug-type flow front before the batch reaches the extrusion die 34.

The extruder 20 can include various additional features. In one example, the extruder 20 can include a second supply port (not shown) at an intermediate portion of the barrel 22 for supplying additional batch material, additives, etc. to be processed by the extruder 20. In another example, the barrel 22 can include open vents (not shown) in communication with the chambers 24, 26 for degassing, and/or even a vacuum vent (not shown) for evacuating the chambers 24, 26 under vacuum. In addition or alternatively, a cooling pipe or the like (not shown) can be coupled to the barrel 22 for cooling, such as by cool water or the like, the batch material (not shown) being processed within the extruder 20. Still, the cooling pipe structure could alternatively be utilized to supply a hot medium, such as hot water or steam, to heat the batch material if desired.

A pair of extruder screw sets are mounted in the barrel 22. As shown, a first screw set 38 is rotatably mounted at least partially within one of the chambers 24, while a second screw set 40 is rotatably mounted at least partially within the other of the chambers 26. The first and second screw sets 38, 40 can be arranged generally parallel to each other, as shown. In some embodiments, first and second screw sets 38, 40 can also be arranged at various angles relative to each other. The first and second screw sets 38, 40 can also be coupled to a driving mechanism 42 outside of the barrel 22 for rotation in the same, or even different, directions. It is to be understood that both of the first and second screw sets 38, 40 can be coupled to a single driving mechanism 42, or as shown, individual driving mechanisms 42.

Each of the first and second screw sets 38, 40 can include a number of screw segments along their longitudinal lengths. The screw segments include various screw elements that can impart various processes upon the batch located within the barrel 22. The first and second screw sets 38, 40 can be monolithic such that each of the screw segments and its screw elements are non-removeable from the screw sets 38, 40. Alternatively, as shown, each of the segments can be formed from a plurality of removable screw elements connected successively in the longitudinal (i.e., axial) direction (or even a combination of removable and non-removable segments or elements). In one example, each of the first and second screw sets 38, 40 can include first and second drive shafts 46, 48, respectively, having a rotational axis generally aligned with the centers of the respective chambers 24, 26. The first and second drive shafts 46, 48 can have the plurality of screw segments removably coupled thereto in various manners. For example, the removable screw segments can be removably coupled via a spline shaft, keyway structure, set screws, etc. Still, any or all of the removable screw segments can be non-removably coupled to the drive shafts 46, 48, such as by adhesives, welding, etc.

The plurality of screw segments can include various types. For clarity, it is to be understood that substantially similar, such as identical or mirror twin, screw segments of each of the first and second screw sets 38, 40 will have similar reference numbers with respective "a" or "b" designations, with the understanding that any descriptions can apply to both such similar segments. In one example, a pumping screw segment 44a, 44b can be arranged generally towards the upstream side 28 of the extruder 20 for feeding the batch material from the supply port 32 and pumping or pushing the batch material towards the downstream side 30. The pumping screw segments 44a, 44b can include various single-spiral designs, as desired. For example, the pumping screw segments 44a, 44b can have a single flight or multiple-flight spiral designs. A single flight design is a design that has a spiral with a single lobe (as shown in FIG. 1), whereas a multiple-flight design has a spiral with multiple lobes. The pumping screw segments 44a, 44b in FIGS. 1 and 2 have a single flight design. Furthermore, each of the pumping screw segments 44a, 44b can be a meshing type segment having flights arranged so as to mesh with each other inside the barrel 22. For example, during rotation, one of the pumping screw segments 44a can scrape material off the other pumping screw segments 44b.

The ceramic batch material processed by the twin-screw extruder 20 (e.g., such as cordierite batches) can be sensitive to the amount of shear mixing and/or temperature fluctuations that occurs inside the extruder 20, which can result in differential flows causing various internal defects at the exit of the extrusion die 34. Moreover, undesirable patterns and/or defects can be created in the cell walls of a honeycomb extrudate as a result of patterns in rheology of the batch slug that feeds the extrusion die 34. Such patterns can be impacted by mixing or shear stress distributions imparted to the batch from the twin-screw mixing and pumping of the twin-screw extruder 20. The patterns can also be impacted by temperature variations caused by the twin-screw mixing and/or the cooling system coupled to the barrel 22, such as a relatively hotter center batch and a relatively cooler skin. In various examples, the undesirable patterns and/or defects can include "swirl" patterns which result from the discharge of the batch from the screws 38, 40 during each revolution, and/or swollen webs that buckle or become "wiggly" in the direction of flow. In addition or alternatively, other possible undesirable patterns and/or defects within the cell walls can include internal tearing, auger spots, and/or fast-flow webs.

As a result, it can be beneficial to provide different screw segments located towards the downstream side 30 of the barrel 22 and near the discharge port 36 to promote a relatively more uniformly mixed and discharged batch material to reduce temperature, shear, and/or composition constituent gradients at the discharge port. As discussed more fully in U.S. Patent Application No. 2010/0052206, which is fully incorporated herein by reference, for example, the different screw segments located towards the downstream side 30 of the barrel 22 can provide efficient pumping of the ceramic batch material under relatively high pressures (e.g., 1,000-5,000 psi) while reducing, such as minimizing, energy input and while promoting relatively more uniform dispersive and distributive mixing. In addition or alternatively, the operating pressure can be reduced, the overall temperature can be reduced, and/or the temperature fluctuations can be reduced.

Figure 3:
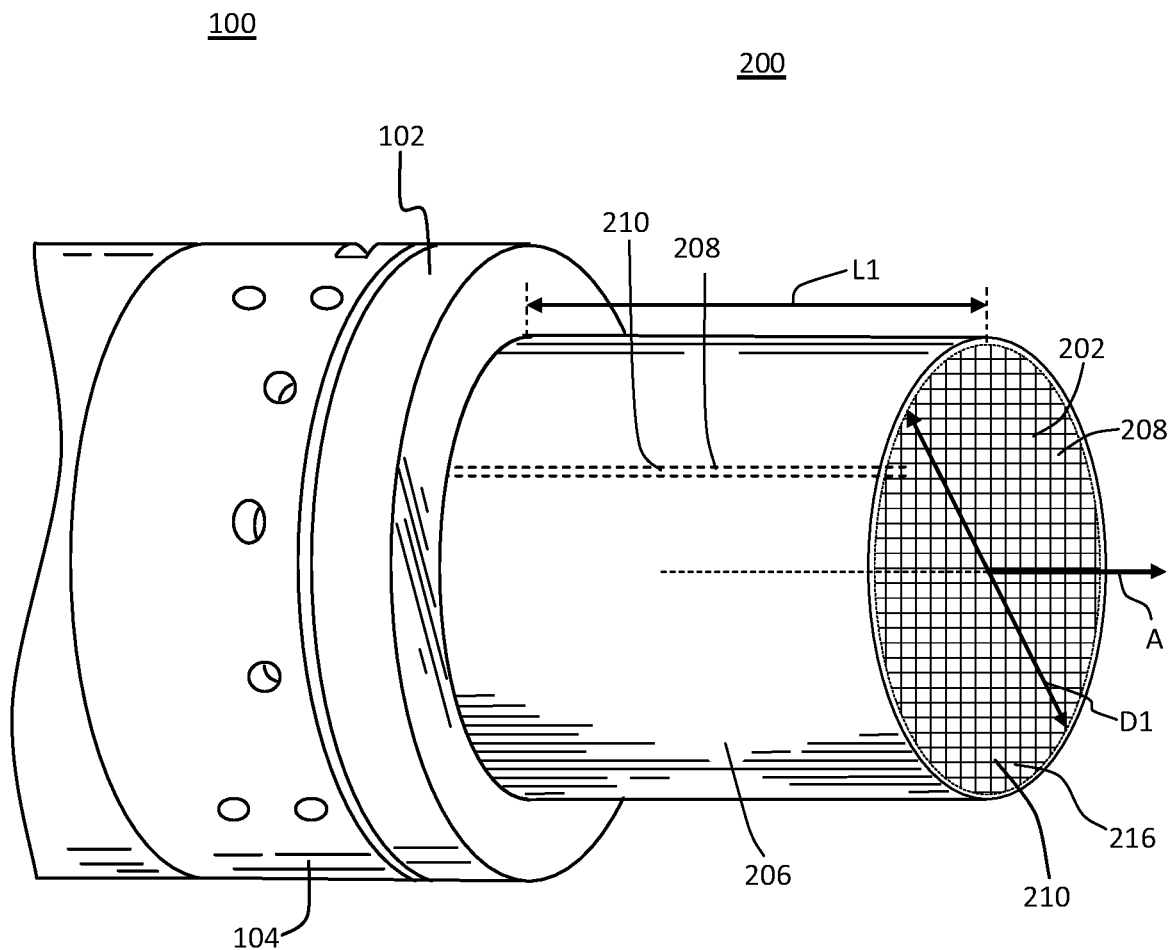
FIG. 3 is a schematic illustration of an extruder front end and a honeycomb extrudate.

FIG. 3 is a schematic illustration of an extruder 100 and a honeycomb extrudate 200. The extruder can include a front end 102 where the batch exits the extruder 100 as the honeycomb extrudate 200. An extruder cartridge 104 can include extrusion hardware including an extrusion die and skin forming mask. The honeycomb extrudate 200 can comprise at least one channel and an outer peripheral surface. The honeycomb extrudate 200 can comprise a honeycomb structure. The honeycomb extrudate 200 has a length L1 and includes a first end face 202 and an outer peripheral surface 206 extending from the extruder front end 102 to the first end face 202. A plurality of intersecting walls 208 can form mutually adjoining channels 210 that extend in the extrusion direction indicated by axial direction "A" and form a honeycomb matrix. Intersecting walls 208 forming a channel 210 extending in the extrusion direction are shown by dashed lines for illustration. A maximum cross sectional dimension perpendicular to the axial direction is indicated by "D1". For example, when the honeycomb extrudate 200 is a cylinder shape, the maximum dimension "D1" may be a diameter of an end face 202. For example, when the honeycomb extrudate 200 cross section perpendicular to the axial direction is a rectangular shape, the maximum dimension "D1" may be a diagonal of an end face.

While extrusion is illustrated as horizontal in FIG. 3, this disclosure is not so limited and extrusion can be horizontal, vertical, at some incline thereto, and at combinations thereof.

Cell density of the honeycomb extrudate 200 comprising the honeycomb structure (honeycomb extrudate) can be between about 100 and 1500 cells per square inch (cpsi) (between about 15.5 and 232.5 cells per square cm). Typical cell wall thicknesses can range from about 0.025 mm to about 1.5 mm (about 1 to 60 mil). For example, honeycomb extrudate 200 geometries may be 400 cpsi with a wall thickness of about 8 mil (400/8) or with a wall thickness of about 6 mil (400/6). Other geometries include, for example, 100/17, 200/12, 200/19, 270/19, 600/4, 400/4, 600/3, 750/2, and 900/2. As used herein, honeycomb extrudate 200 is intended to include a generally honeycomb structure but is not strictly limited to a square structure. For example, hexagonal, octagonal, triangular, rectangular, circular, elliptical, other curved shape, or any other suitable cell shape or any combination thereof, such as polygonal with rounded corners and/or arced walls, may be used. Also, while the cross section of the honeycomb extrudate 200 is illustrated as circular, it is not so limited, for example, the cross section can be elliptical, square, rectangular, asymmetrical, symmetrical, or other desired shape, and combinations thereof.

Upon exiting the extruder 100 in the direction of arrow "A" (also referred to herein as the "axial direction" or the "extrusion direction"), the batch stiffens into a wet extrudate 200 comprising a network of axially extending intersecting walls 208 (webs) that form axially extending channels 210 and an axially extending outer peripheral surface 206. The webs 208 and channels 210 comprise the matrix 216. Disposed at the outer periphery of the matrix 216 is the outer peripheral surface 206. While described as comprising a plurality of channels, the wet extrudate may also comprise only one channel in some exemplary embodiments, such as a pipe, wherein the channel makes up the hollow interior of the pipe.

For ease of description, the exemplary embodiments refer to wet green honeycomb bodies and wet extrudate; as used herein, wet greenware refers to greenware prior to drying.

Figure 4:
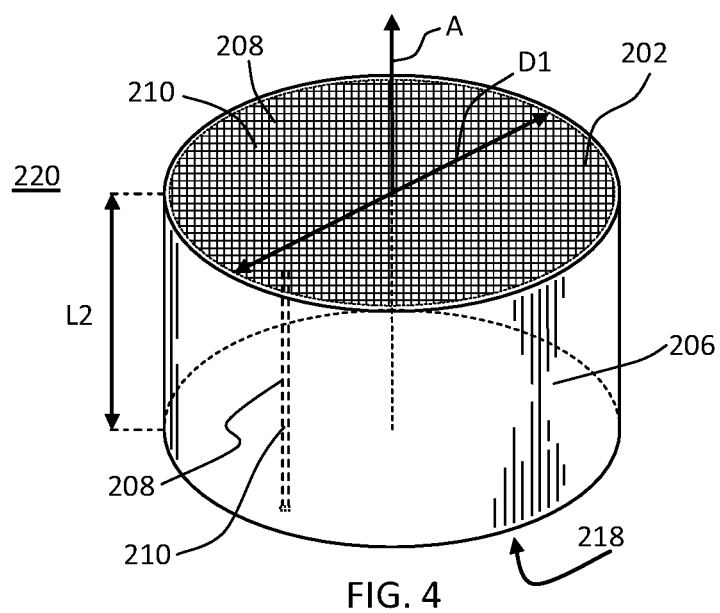
FIG. 4 illustrates a schematic honeycomb body according to one exemplary embodiment of the disclosure.

FIG. 4 illustrates a schematic honeycomb body 220 according to exemplary embodiments of the disclosure. The batch material upon exiting the extruder front end 102 can be a wet green honeycomb extrudate 200 that can be cut to length L2 forming a second end face 218 (as shown in FIG. 4) to form a wet green honeycomb body 220. That is, the wet green honeycomb body 220 can be cut from the wet green honeycomb extrudate 200. The outer peripheral surface 206 of the wet green honeycomb body 220 can extend axially from the first end face 202 to the second end face 218. The wet green honeycomb extrudate 200 can be supported on a support such as an air bearing, tray, or conveyor that moves in the extrudate travel direction. The wet green honeycomb body 220 can be transported to a dryer on a support such as an air bearing or a tray suitable for supporting a length of extrudate 200 such as a body 220 for transport to a dryer. Tray features may include an axial length and a transverse cross-section revealing a concave portion defining a support surface, that surface being configured to support the body 220. The longitudinal axis of the tray and the section of extrudate forming honeycomb body 220 may be parallel to the direction of extrusion and to the orientation of honeycomb channels 210 in that section of extrudate.

The honeycomb extrudate 200 can have a bow when it exits the extrusion die of the extruder front end 102. Examples of extrudate bow corrector devices for correcting bow in a stream of extruded material are provided in U.S. Pat. No. 6,663,378, issued Dec. 16, 2003, U.S. patent application Ser. No. 10/370,840 and Publication No. 2004/0164464, published Aug. 26, 2004, and U.S. patent application Ser. No. 14/061,129 and Publication No. 2015/0108680, filed on Oct. 23, 2013, all of which are hereby incorporated by reference herein in their entireties.

The honeycomb body 220 can be severed from the extrudate 200. The severing can be performed by laser cutting, wire cutting, or saw cutting, such as a band saw or reciprocating saw. The honeycomb body 220 can have a honeycomb structure, a length L2, volume V2, and include the first end face 202, the second end face 218 and an outer peripheral surface 206 extending from the first end face 202 to the second end face 218. The plurality of intersecting walls 208 that form mutually adjoining channels 210 extending in the axial direction "A" between opposing end faces 202, 218 form the honeycomb matrix 216. Intersecting walls 208 forming a channel 210 extending between the end faces 202, 218 are shown in dashed lines for illustration. The axial direction is indicated by arrow "A" and a maximum cross sectional dimension perpendicular to the axial direction is indicated by "D1". The top face 202 refers to the first end face 202 and the bottom face 218 refers to the second end face 218 of the honeycomb body 220 positioned as shown in FIG. 4. Otherwise, the end faces are not limited by the orientation of the honeycomb body 220. The top face 202 may be an inlet face and the bottom face 218 may be an outlet face of the honeycomb body 220. The outer peripheral surface 206 of the honeycomb body 220 extends axially from the first end face 202 to the second end face 218. While described as a honeycomb body, the extruded body may also have a simpler form. For example, the body may comprise only one channel, such as a pipe, wherein the channel makes up the hollow interior of the pipe. As used herein, the honeycomb body 220 can be a log that can undergo further processing prior to firing or the honeycomb body 220 can be a piece of final size substantially ready for firing.

Extrusion screw designs can lead to non-uniform rheology discharged out of the extrusion screws which results in flow driven quality defects in the extruded ware. Non-uniform mixing of the batch can lead to localized rheology differentials across the diameter of the batch slug which feeds the die. Rheology differentials of stiffness and wall-drag differences can cause web velocity variation at the exit face of the die, which leads to stresses that are sufficient to cause a range of flow defects. Flow defects out of the die can include: swollen webs, fast flow webs, distorted cells, bow variability, end of log shape defects, internal tears, and extrude-to-shape shape related defects such as pull-in and tilt.

Research to improve flow uniformity and reduce defects has included work on extrusion processes, batch composition modification, and die specifications such as preferentially coating the slots in the dies. Modification of the extrusion process has focused on increasing overall mixing energy and has included mixing homogenizers, screw design work, and double flighted screw elements. Mixing homogenizers are screen support plates that re-distribute batch from one location to another via channels that exit in a different location from the entrance with respect to the axial direction of the extruder. Screw designs have increased mixing energy, but did not necessarily increase uniformity, and in some cases made the uniformity worse. Some screw designs have also generated excessive heat which can be detrimental to throughput. These have included kneaders focused in the counter bore region, raker screw designs, tri-lobe screw designs, kneader blocks, combers, Igel mixing elements, and the like. As used herein, the counter bore region refers to the discharge end of the screw. Double flighted screw elements have been used in the discharge position on the drive shaft (counter bore) in an effort to reduce the number and severity of internal tears in the resulting extruded green body. It is hypothesized that the double flight increases "mixing" of the batch which leads to reduced sensitivity to tears. While the double flight did increase total mixing energy, the uniformity distribution of shear into the batch was not improved. A screw design focused on pumping efficiency, thereby minimizing heat generation and enabling higher extrusion throughput, tends to sacrifice some mixing uniformity which can lead to non-uniform flow.

Figure 14:
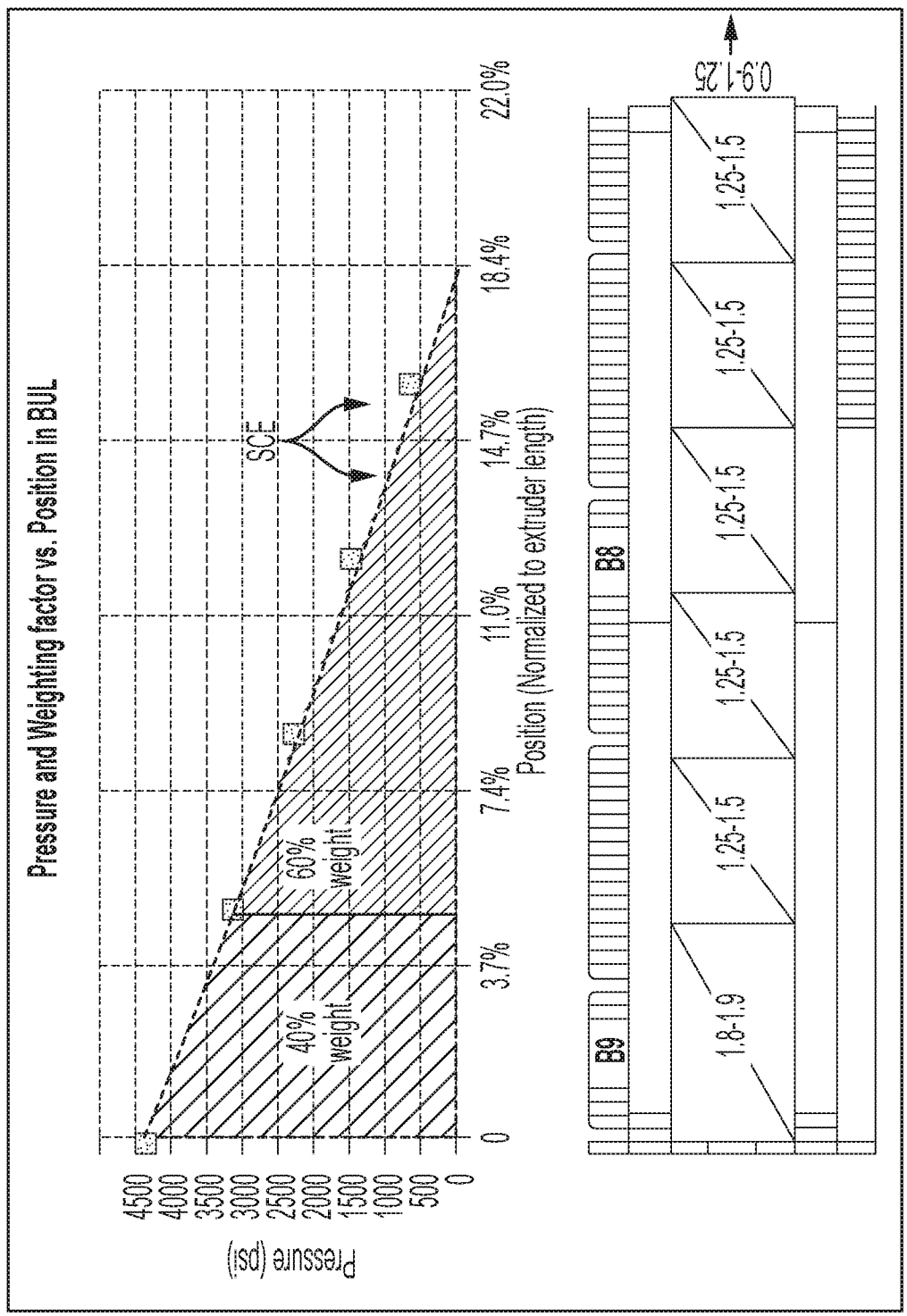
FIG. 14 shows a plot of pressure versus position within the extruder for a set of screw elements in accordance with one embodiment of the present disclosure.

Exemplary embodiments of the disclosure relate to extrusion of honeycomb bodies. More specifically, exemplary embodiments of the disclosure relate to segment geometries and segment configurations on extrusion screws in a pressure generating zone of an extruder that create more uniform mixing and, therefore, uniform flow out of the extruder. This is achieved, for example, by using segments with high pitch to diameter ratios in a backup length region of the extruder to balance radial and axial forces that are generated by the extrusion screw. As used herein, the "backup length region" refers to a region within the barrel where batch contributes to pressure on the extruder die. For example, FIG. 14 shows an example of a backup length region where the backup length region extends from a normalized position of 0 to a normalized position of 18.4%. More radial force corresponds to more mixing ability and more axial force corresponds to more pumping ability. According to these exemplary embodiments of the disclosure, an improved extrudate quality can be provided.

According to some exemplary embodiments of the disclosure, a single-flighted, high pitch screw element that addresses long standing flow issues, such as shape and cell quality, by delivering a uniform rheology profile to the extruder die is provided. According to some of these exemplary embodiments the function of extrusion screws is improved by balancing the pumping and mixing aspects of the geometry to deliver a more uniformly mixed (sheared) batch out of the screw section. Using a combination of theoretical calculations for pumping efficiency and mixing combined with empirical extrusion trials, an optimized range of screw pitch, given the constraints of the extrusion process, was discovered and is disclosed herein.

According to these exemplary embodiments, flow defects are reduced or eliminated and shape is improved by reducing bow variability and end of log tilt. These improvements are a result of thermal and shear uniformity both axially (variations in time) and radially (across the face of the die). For example, batch uniformity was found to be improved for a 160 mm pitch screw element at screw fill levels (SFL) of 32.25 and 20.5 kg/hr/rpm for an industry series extruder having a 92 mm extruder diameter. Screw fill levels SFLs scaled for different size machines can be determined by one of ordinary skill in the art based on the teachings disclosed herein. The experimental results showed that both screw pitch and twin screw extruder machine (TSM) rotational speed, referred to herein as rotations per minute (RPM), contribute to uniformity, and that the two are interdependent. The higher pitches (160 mm, 200 mm, and 240 mm) had improved uniformity at lower RPM, whereas the 80 mm pitch and 120 mm pitch were more uniform at higher RPM. As explained later herein, these results correlate well with the optimized efficiency calculations.

Figure 5:
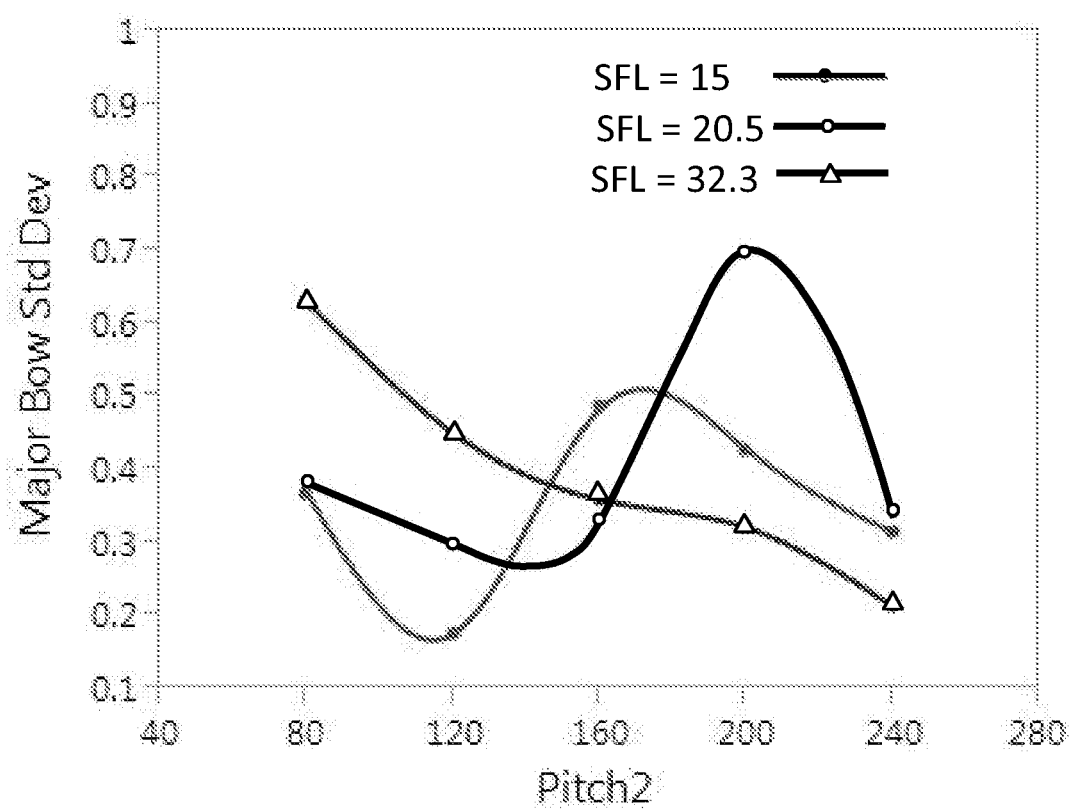
FIG. 5 illustrates data demonstrating improved bow variability for ceramic batch extrudate using pump and mix screw elements according to some exemplary embodiments of the disclosure.

According to these exemplary embodiments, general shape can be improved by improved bow variability as demonstrated by the data in FIG. 5 that shows bow variability for multiple production runs. Bow variability can be improved by implementing a low wall drag composition as disclosed in U.S. patent application Ser. No. 14/673,240, filed on Mar. 30, 2013, which is hereby incorporated by reference herein in its entirety. Bow variability was further improved in a 80 mm pitch screw configuration, where the major bow standard deviation dropped about 40% (0.65 to 0.4) when going from a 32 kg/hr/rpm Screw fill level (SFL) to a 20.5 or 15 kg/hr/rpm. Changing the pitch from 80 mm to 120 mm provided additional reduction in the major bow standard deviation of about another 50% for a SFL of 15 kg/hr/rpm. For a SFL of about 32 kg/hr/rpm, 160 mm pitch provides additional reduction in major bow standard deviation. Reduction in bow variability results in reduced end trim and reduced losses due to shape defects.

According to these exemplary embodiments, general shape can be improved by a reduction in end of log tilt. As shown schematically in FIG. 6 as batch exits the die it possesses a temperature or shear profile from screw discharge patterns. The temperature or shear profile imposes a faster flow at the 4 o'clock and 10 o'clock positions than at the other positions across the extrudate face as the batch is extruded in axial direction A. If the log were unconstrained, the non-uniform flow would cause the fast flow areas to curl in and deform as indicated by arrows C while the slow flow areas to curl out as indicated by arrows B resulting in log tilt. However, the log is constrained and cannot deform leading to a buildup of stress. When the log is severed, the stress is released near the ends of the log resulting in tilt deformation at the ends. End of log tilt (EoLT) reduction is shown in FIG. 7 for the tested screw configurations according to exemplary embodiments of the disclosure. The end of log tilt reduction is shown by flat tilt profiles surrounded by boxes in FIG. 7. For example, results for 0.9, 1.3, 1.8, 2.2, and 2.7 screw pitch to screw diameter and a SFL of 32.3 kg/hr/rpm are shown across the top row. 1.3 pitch to diameter at SFL of 20.5 kg/hr/rpm and SFL of 15 kg/hr/rpm provided good EoLT as did 1.8 pitch to diameter and a SFL of 20.5 kg/hr/rpm. End of log tilt reduction enables end trim reduction and improved green material utilization providing manufacturing efficiency as well as shape improvement.

According to these exemplary embodiments, additional advantages include improved process stability, process pressure stability and improved tensile properties of the extrudate due to better mixing. While not wishing to be bound by theory, improved tensile properties can be due to improved binder hydration. Additional advantages include improved plasticity of the batch, elastic modulus, young's modulus, and strain at break that lead to resistance to internal tears and skin defects such as air checks and fissures in the extrudate. In addition, extrudate shape is improved due to higher extrudate stiffness.

Table 1 provides screw configurations tested to empirically evaluate the impact of pitch on process and uniformity compared to the calculated efficiency (pumping or mixing). The general description of the screw pitch and length of each is shown in Table 1. All screw configurations shown are from an extruder machine with a 92 mm extruder diameter and include pitches of 80 mm (std), 120 mm, 160 mm, 200 mm and 240 mm. Extrusion direction is from right to left.

TABLE 1

| Example No. | Example Configuration |
|---|---|
| I | 0.9 pitch/dia. segments over entire length |
| II | 1.3 pitch/dia. segments over 720 mm length |
| III | 1.7 pitch/dia. segments over 240 mm length ← 1.3 pitch/dia. over 480 mm length |
| IV | 2.2 pitch/dia. over 200 mm length ← 1.3 pitch/dia. over 600 mm length |
| V | 2.6 pitch/dia. over 240 mm length ← 1.3 pitch/dia. over 480 mm length |
| VI | Variable pitch, 0.9 Pitch/Dia. 0.4 Pitch/Dia. over 120 mm length ← 1.7 Pitch/Dia. over 160 mm ← 1.3 pitch/dia. over 480 mm length |

Figure 8:
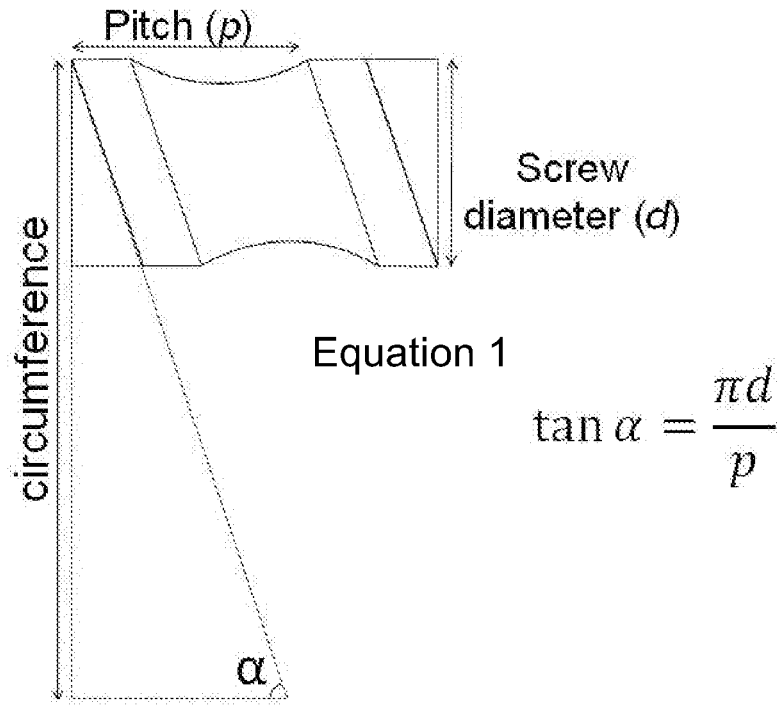
FIG. 8 is a schematic side view of a screw geometry and a resulting formula to calculate helix angle, $\alpha$, in terms of screw diameter, d, and screw pitch, p.

FIG. 8 is a schematic side view of a screw geometry and a resulting formula to calculate helix angle, α, in terms of screw diameter, d, and screw pitch, p. A screw can be defined by its outer diameter, d, and its pitch, p, as shown in FIG. 8. From these two numbers, the helix angle, α, can be calculated. As shown, Equation 1 defines the helix angle, α, as tan α=(πd)/p.

$$\tan \alpha = (\pi d)/p. \qquad \text{Equation 1}$$

Figure 9:
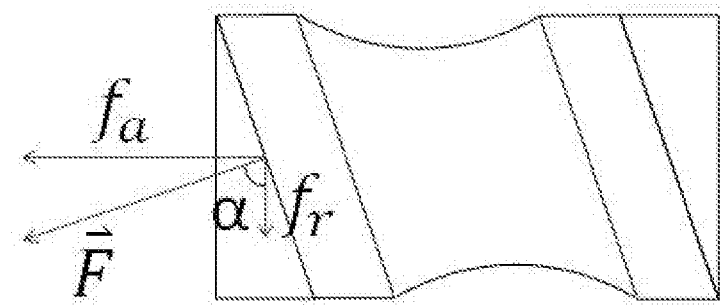
FIG. 9 is a schematic side view of a screw geometry and a force, F, from the screw on a particle of batch and axial and radial components of the force.

FIG. 9 is a schematic side view of a screw geometry and a force, F, from the screw on a particle of batch and axial and radial components of the force. The axial and radial components of the force are proportional to the sine and cosine of α, respectively. Therefore, sin(α) can be thought of as the percent of theoretical maximum pumping ability, and cos(α) can be thought of as percent of theoretical maximum mixing ability. The axial component, $f_a=F(\sin \alpha)$, correlates with pumping efficiency and the radial component, $f_r=F(\cos \alpha)$, correlates with mixing efficiency.

$$f_a=F(\sin \alpha)$$

$$f_r=F(\cos \alpha) \qquad \text{Equation 2}$$

The pumping efficiency of a screw with a given pitch at a given screw fill level (SFL) can also be calculated as a percent of theoretical maximum efficiency. Equation 3 (below) describes pumping efficiency which is defined as the percentage of the actual volume discharged out of the potential volume that could be discharged in one revolution. Equation 4 (below) describes screw fill level (SFL) as equal to feed rate divided by RPM. 100% pumping efficiency would correspond to the situation where, in one revolution of the screws, all of the mass of batch contained in the open volume of an element was moved forward by a length equivalent to one pitch.

$$eff\ \% = \frac{\text{volume discharged per revolution}}{\text{open volume in the lenght of one pitch}} \quad \text{Equation 3}$$

$$SFL = \frac{Feedrate}{RPM} \quad \text{Equation 4}$$

Figure 10:
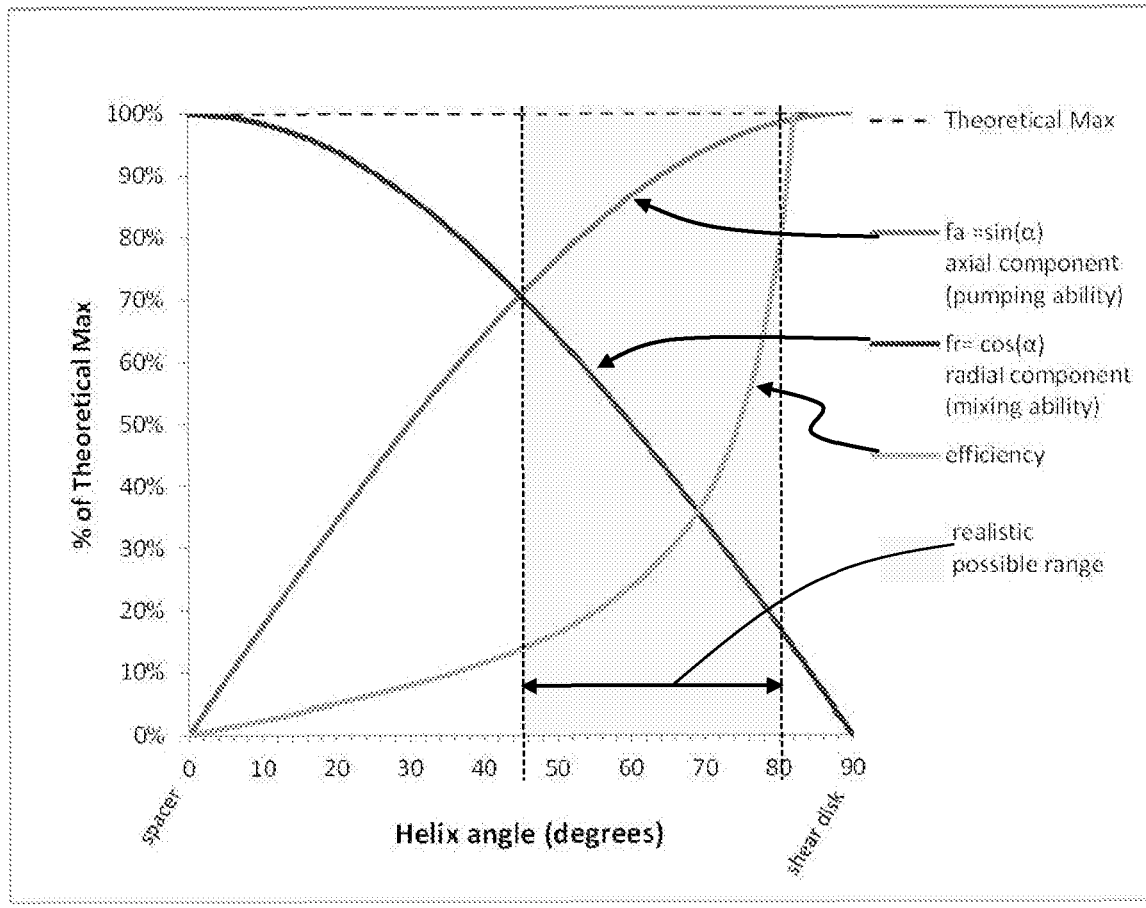
FIG. 10 is a graphical plot of theoretical efficiency in percent (%) for a 92 mm extruder at a screw fill level (SFL) of 20.5 as a function of helix angle, $\alpha$, showing the axial and radial components and the pumping efficiency as calculated using Equations 1, 2, 3, and 4, according to some exemplary embodiments of the disclosure.
Figure 11:
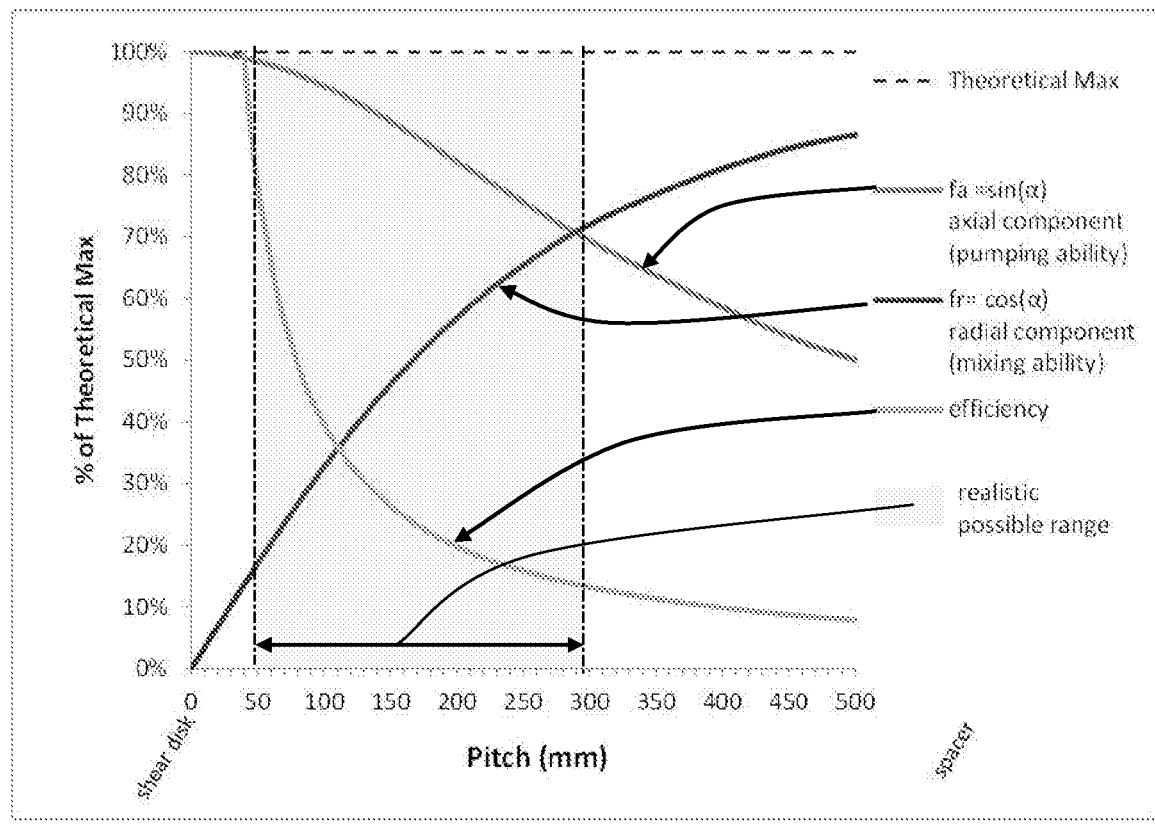
FIG. 11 is a graphical plot of % theoretical efficiency for a 92 mm extruder at a SFL of 20.5 as a function of screw pitch showing the axial and radial components and pumping efficiency as calculated from Equations 1, 2, 3, and 4, according to some exemplary embodiments of the disclosure.

FIG. 10 is a graphical plot of theoretical efficiency in percent (%) for a 92 mm extruder at a SFL of 20.5 as a function of helix angle, α, showing the axial and radial components and the pumping efficiency as calculated using Equations 1 and 2 in FIGS. 8 and 9, respectively, and Equations 3 and 4. FIG. 11 is a graphical plot of theoretical efficiency in percent for a 92 mm extruder at a SFL of 20.5 as a function of screw pitch showing the axial and radial components and pumping efficiency as calculated from Equations 1 and 2 in FIGS. 8 and 9, respectively, and Equations 3 and 4. The practical range is the range of screw pitches that are reasonable for a ceramic batch process to extrude honeycomb bodies. Note the steep decline in efficiency as pitch approaches 50 mm. This dramatic change in efficiency can cause issues in the extrusion process as will be discussed later.

The impact of pitch and helix angle on the axial (pumping) and radial (mixing) components, along with the efficiency at a constant screw fill level, are shown in FIGS. 10 and 11. Pumping and mixing ability vary sinusoidally with pitch, with higher pitch screws being better mixers while lower pitch screws being better pumpers. Efficiency, on the other hand, has a hyperbolic relationship with pitch, and goes to infinity as the pitch approaches 0 (the equivalent of a shear disk). Also shown in FIGS. 10 and 11 is a practical range of pitches that could be used in the ceramic extrusion process (from a pitch of 50 mm to a pitch of 300 mm).

Exemplary embodiments of the disclosure provide an improved ceramic batch extrusion process by determining the pitch that yields the best balance of mixing and pumping given the constraints of the extrusion process. For instance, there are a number of factors that must be considered when selecting the pitch. Some of these factors include process responses and a desire to maximize operating window balanced against part quality. Process responses include operating temperature, backup region length, torque, and pressure. Temperature is affected by higher pitch screws that generate more heat as a byproduct of more mixing than lower pitch screws. Higher pitch screws have longer backup length regions than lower pitch screws. The backup length may be kept in a particular range in order to maintain a stable process, for example, about 16% +/−5% of the extruder length, such as about 11% to about 21%. However, the backup length can also be about 10% to about 45% of the extruder length. In some embodiments, the backup length can be greater than 45%, such as greater than about 55%, greater than about 65%, or greater than about 75% of the extruder length. Higher pitch screws have higher torque than lower pitch screws due to more surface area of batch in contact with the screws with higher pitch. Higher pitch screws generally have lower pressure than lower pitch screws due to softer batch via more mixing. Lower pressure is preferable for extrusion, but water call may need to be adjusted to compensate for softer batch. Part quality can be affected in achieving this balance of mixing and pumping in terms of fast flow webs, swollen webs, shadows, and shape, such as tilt, pull-in, and slump.

Screw pitch configurations according to some of these exemplary embodiments were first determined empirically. Pitches from 80 mm to 240 mm were tested on an extruder with a 92 mm barrel. Lower pitches were also tested using a variable pitch element in a counter bore position. The best configurations were then tested on a second 92 mm extruder, and then scaled up to extruders with 170 mm and 177 mm extruder diameters. The configurations found to be most preferred were the same across all of the different machines tested. To scale up properly, the twin screw extruder machine (TSM) design was also considered. Advances in extrusion technology have increased the open volume of the screws and made them more efficient. One example is a mega-compounder design from COPERION™. All parameters being equal, a TSM with a 92 mm extruder diameter is more efficient than a TSM with a 90 mm extruder diameter due to the larger open volume of the screws made possible by a splined shaft from a keyed shaft. The same is true for a TSM with a 177 mm diameter compared to a TSM with a TSM with a 170 mm diameter. Such mega-compounder designs can reach 480 mm in extruder diameter.

Figure 12:
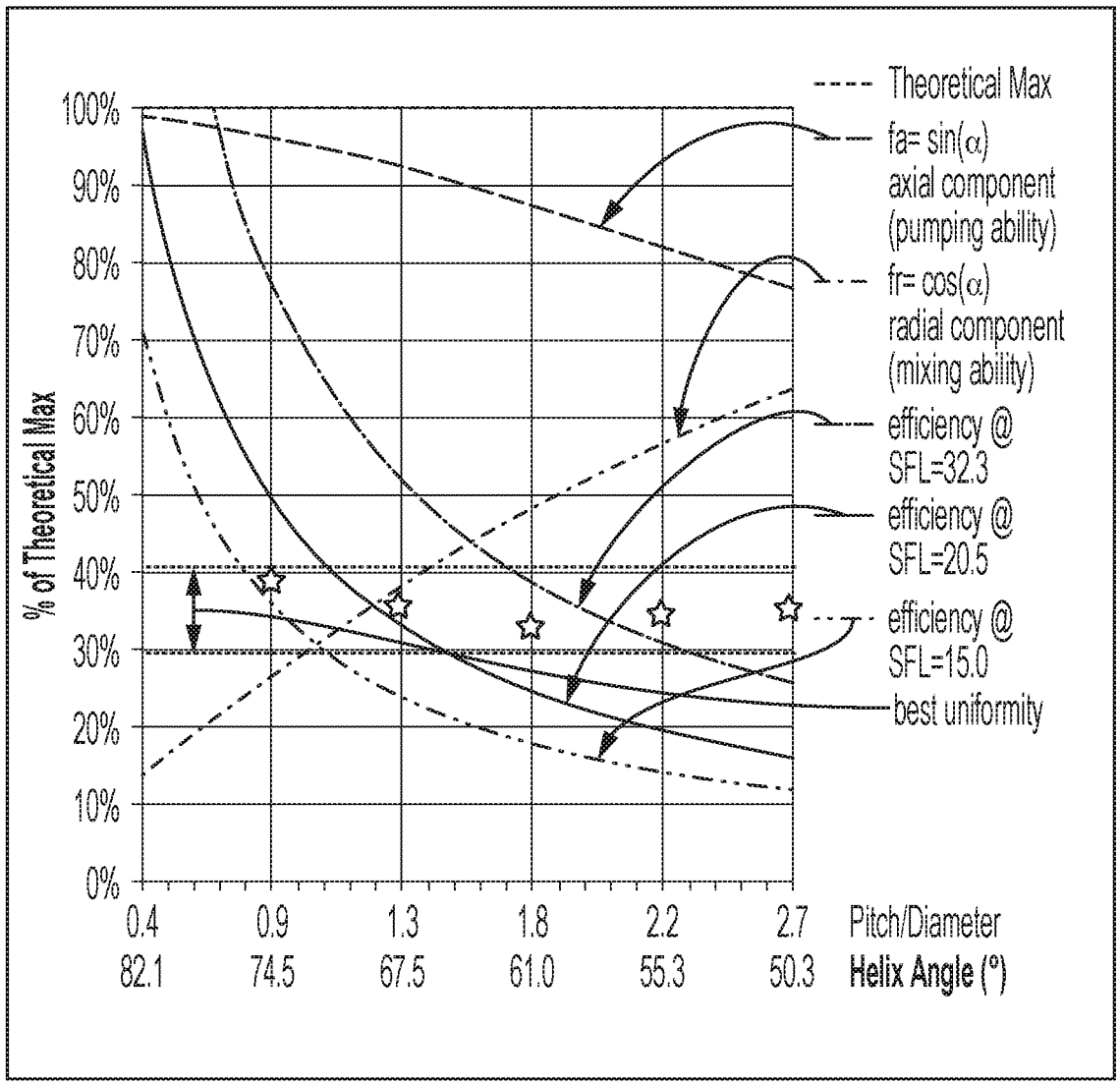
FIG. 12 shows an efficiency range identified by empirical testing of screw configurations set forth in Table 1 according to some exemplary embodiments of the disclosure, according to some exemplary embodiments of the disclosure.

FIG. 12 illustrates an efficiency range identified by empirical testing of the screw configurations set forth in Table 1. It is clear from the figure that flow front uniformity depends on both screw pitch and screw fill level, and that the greatest flow front uniformity generally occurs when the combination of pitch and screw fill level is such that the efficiency is 30% to 40%. In other words, it is not screw fill level or pitch alone that drives flow front, but efficiency. Therefore, it might be reasonable to assume that one could select any pitch, and simply adjust the SFL in order to target 30% to 40% efficiency and thereby optimize the flow front uniformity. However, this approach does not consider all of the other factors listed above (pressures, temperatures, torque, etc.) that define the operating window of the machine. The stars in FIG. 12 indicate the processes with the most uniform flow, which were interpolated or extrapolated from the set of experimental conditions that were run. The graph shows that an improved combination of SFL and pitch at a constant pumping efficiency is between about 30% and about 40%.

For scaling to different sized extrusion machines, the curves may be different as can be derived by one of ordinary skill in the art based on the teachings disclosed herein. And while the curves can vary, the 30% to 40% efficiency is still preferred.

Figure 13:
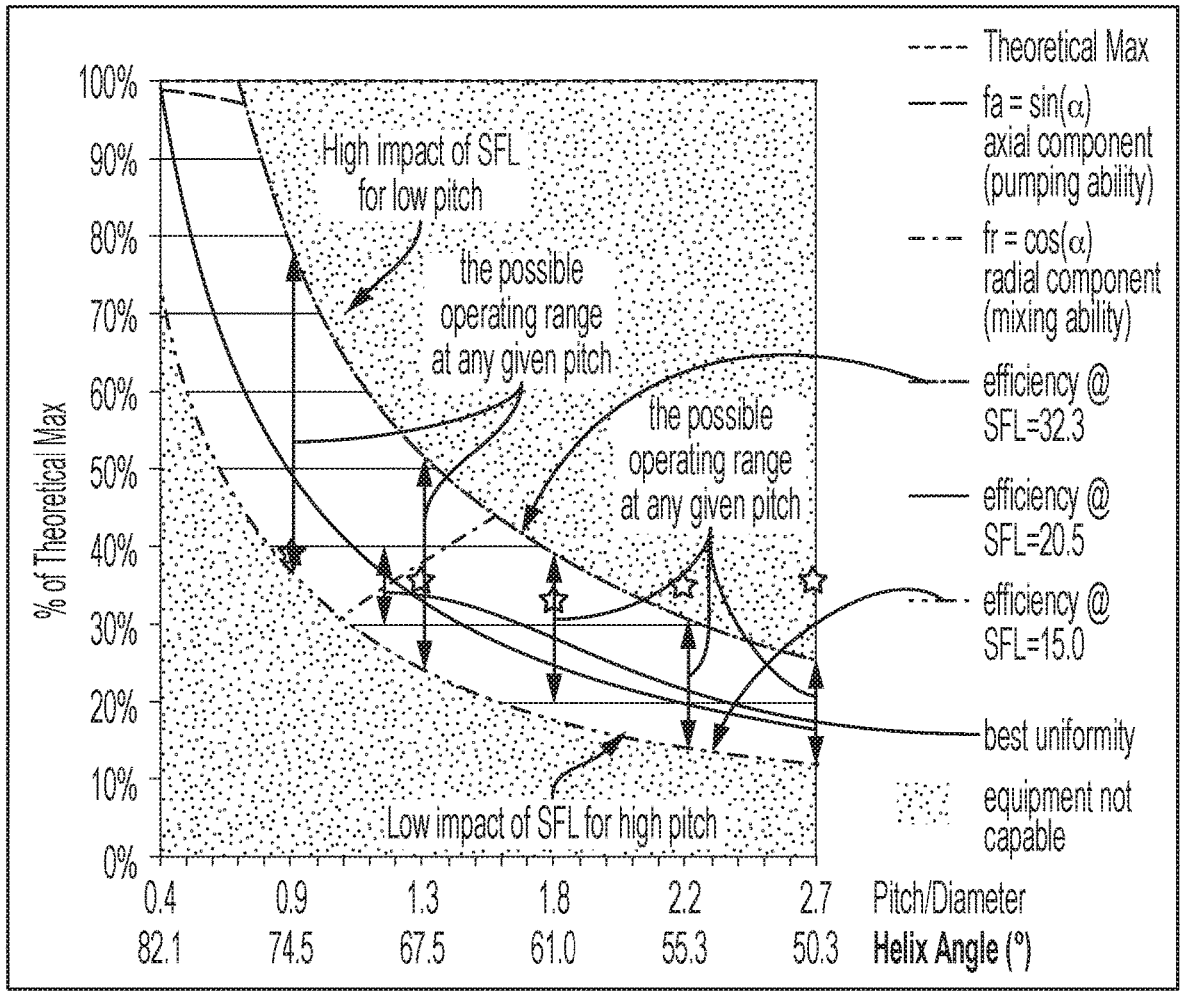
FIG. 13 shows the operating window of FIG. 12.

FIG. 13 shows the operating window of FIG. 12. The practical operating window of the TSM is driven by screw fill level (as well as feed rate, which is not considered here). FIG. 13 shows that 30% to 40% efficiency with a pitch/diameter of 2.2 or 2.7 within the constraints of the equipment/process is difficult to achieve, if possible at all. The SFL would have to be very high to achieve this efficiency, which would cause the pressure and the torque to be too high to operate at the standard feed rate. Therefore, an improved strategy was to select the pitch that centers the 30% to 40% efficiency in the middle of the operating range of the extruder. From FIG. 13, a 1.3 pitch/diameter ratio was selected. The dashed lines in FIG. 13 illustrate the efficiency at different SFL's (RPM). The SFL of 15 and 32.3 kg/hr/rpm are realistic operating limits for this process, and so the range between the dashed lines is the operating window for this process. Thus, the vertical arrows represent the possible operating range at the indicated given pitch. The size of this arrow can be thought of as the strength of the SFL knob on flow front. As used herein, knob refers to a parameter that when adjusted changes the process outcome. Ideally, the SFL knob would be strong enough to allow small process adjustments, but not so large as to cause large process swings. From this perspective as well, the 1.3 and 1.8 pitch to diameter ratios were determined to be well balanced. The 0.9 pitch to diameter ratio was indeed found to be preferred and the 1.8 pitch to diameter ratio was found to be more preferred for a screw configuration with a single pitch. The 1.3 pitch to diameter ratio was found to be the most preferred arrangement for screw configuration with a single pitch.

The graph in FIG. 13 also shows how the impact of SFL on efficiency changes as a function of pitch. At low pitch, SFL (or RPM) has a much larger impact on efficiency than at higher pitches. One surprising and unexpected implication illustrated here is that different pitch screws are preferably operated within different efficiency ranges. For example, a 0.9 pitch to diameter ratio screw can be operated at efficiencies between about 35% and 75%. A 2.7 pitch to diameter ratio screw can only be operated at efficiencies of about 15% to 27%. This information was used to identify a range of pitches and SFL's that are preferred to provide the desired 30-40% efficiency zone over the entire process window. The graph suggests that the 1.3 pitch to diameter ratio screws have the desired efficiency in the middle of their operating window, and so would be optimal. Additionally, this configuration maximizes the range over which uniformity of batch flow to the back of the die and through the die can be achieved. It was also determined that combinations of pitches can be used. In fact, a preferred configuration is a long section of 1.3 pitch to diameter ratio followed by a section of 1.8 pitch to diameter ratio in the counter bore position.

It was determined that the uniformity could be further improved by using a combination of pitches in the backup length region. Examples of such configurations are provided in Examples III, IV, V, and VI in Table 1. The 30% to 40% efficiency range holds for configurations with varying pitches. It was recalculated as average efficiency of the screws weighted by the total pressure that is placed on them by the backup length in the extrusion process. The results of these calculations are shown in FIGS. 14 and 15.

For screw configurations containing different screw pitches in the backup length, the efficiency was calculated as the weighted average of the efficiencies of the individual pitches, where the weight is equal to the total pressure on that length of screw element in the extrusion process. For example, FIG. 14 shows a 320 mm pitch screw with a 320 mm length. Based on the pressure probes in the extruder, it was estimated that the total pressure on the 320 mm length is 40% of the total pressure. The values shown in FIG. 14 are for a 177 mm extruder.

Figure 15:
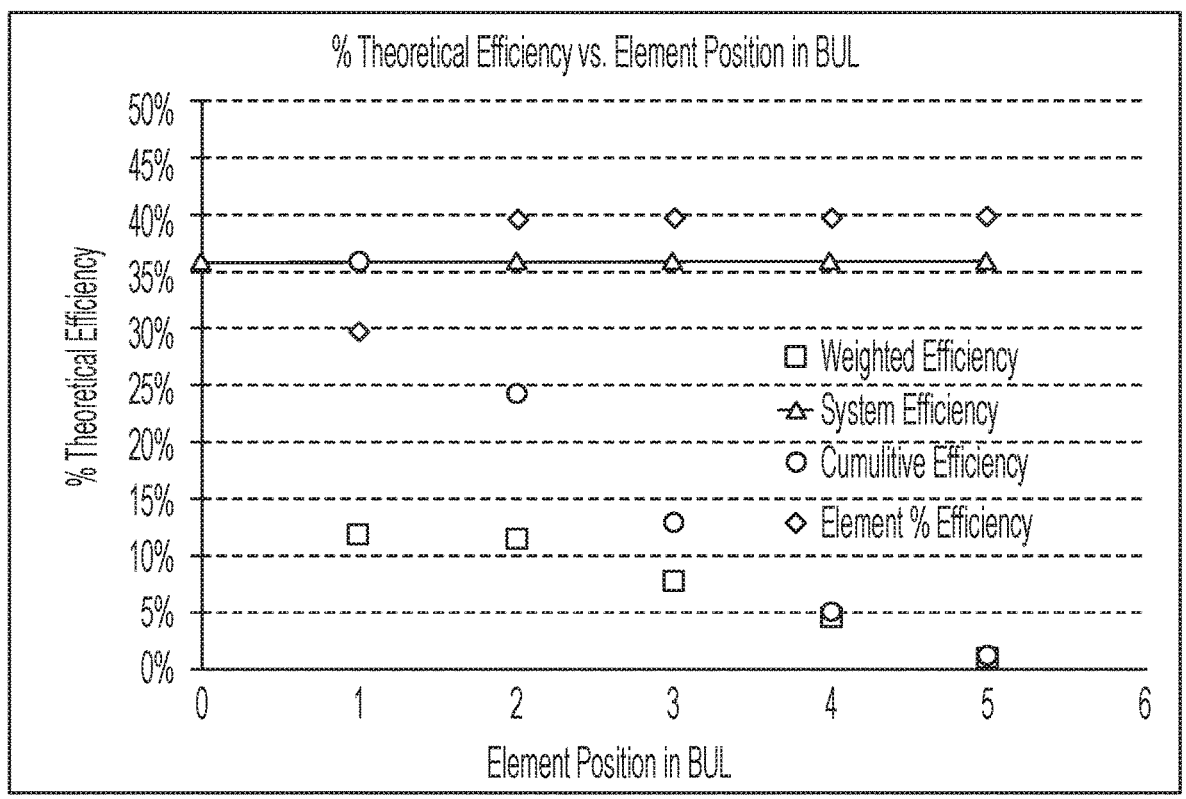
FIG. 15 shows a plot of theoretical efficiency versus screw element position within the backup length region.

FIG. 15 shows details behind the calculation of the weighted average in FIG. 14. The pumping efficiency of each screw element is shown by diamonds. The weighted efficiency is shown by squares, and the cumulative efficiency is shown by circles. The result was that the total system efficiency was just over 35%. An implication of this weighted average efficiency calculation is that the location of the screw pitch relative to the backup length has an impact on efficiency. Because the pressure decreases in a direction moving upstream in the TSM, away from the die, the screws further back have less of an impact on the overall efficiency, flow front, uniformity, etc. If the screw element is completely outside of the backup length, the impact on flow front and uniformity is minimal. This has been shown empirically as well. For example, a 240/240 counter-bore was not preferred for multiple reasons. The efficiency was too low and the uniformity was poor. However, placing the 240/240 upstream of the backup length did not have a significant impact. This condition performed in a similar manner to the 120/120 configuration in the backup length region. In the notation xxx/yyy, xxx refers to screw element pitch and yyy refers to segment length.

Figure 16A:
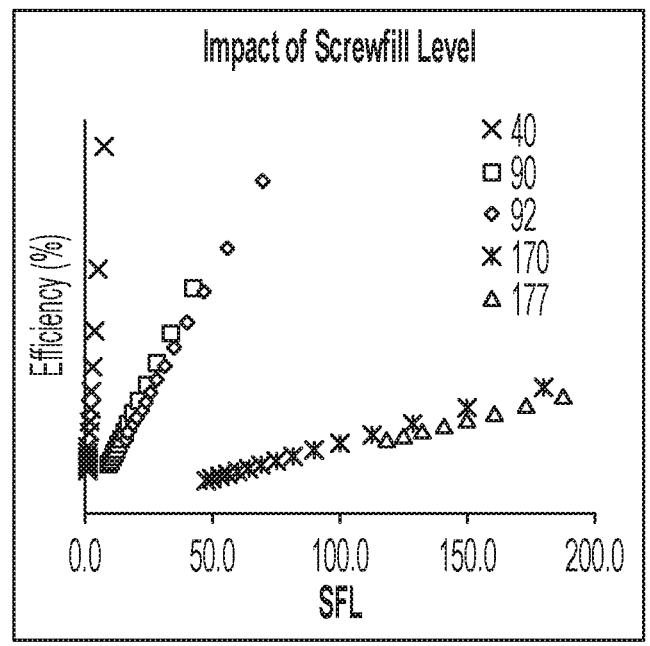
FIGS. 16A and 16B show graphical plots of the response of efficiency as a function of SFL and pitch, p, according to some exemplary embodiments of the disclosure.
Figure 16B:
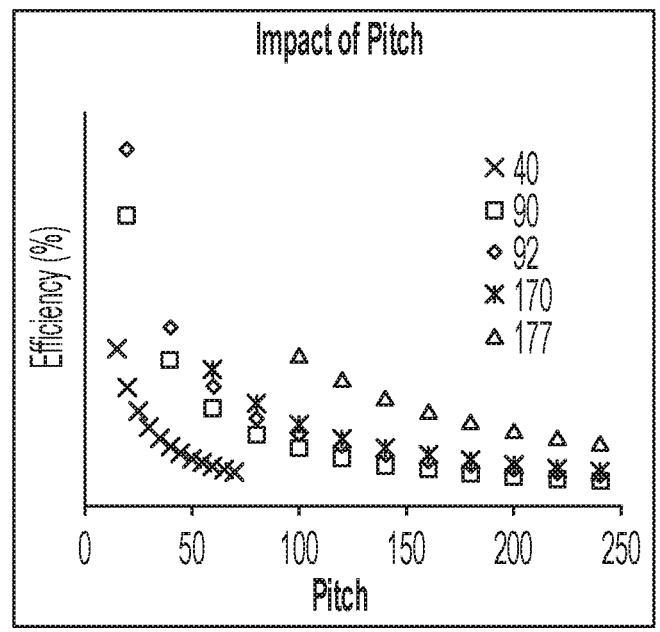

FIGS. 16A and 16B show graphical plots of the response of efficiency as a function of screw fill level (SFL) and pitch, p, respectively. These figures provide a comparison of screw diameter for the different machines on each of these plots (40 mm, 90 mm, 92 mm, 170 mm, 177 mm). Such comparison can be used to help with scaling factors for determining the optimized pitch for each machine based on the teachings disclosed herein.

Based on the above, an improved backup length region configuration for a TSM with a 92 mm extruder diameter is a segment having a 160 mm segment length with a 160 mm screw pitch, followed by a segment with a 600 mm segment length with a 120 mm screw pitch, which has an overall system efficiency of about 35%. This 35% efficiency occurs around a SFL of 29 kg/hr/rev, which is centered in the operating range of the extruder.

According to some of these exemplary embodiments of the disclosure, a screw pitch to screw diameter ratio of 0.9 to 2.6 provides a uniform batch rheology. The screw pitch to screw diameter ratio of 0.9 to 2.6 provides a uniform batch rheology without a negative impact on pressure stability or backup length. For example, the screw pitch to screw diameter ratio can be 0.9 to 2.2 to provide a uniform batch rheology without a negative impact on pressure stability or backup length. In a further example, the screw pitch to screw diameter ratio can be 1.2 to 1.9 to provide a uniform batch rheology without a negative impact on pressure stability or backup length. In yet another example, the screw pitch to screw diameter ratio can be 1.2 to 1.5 to provide a uniform batch rheology without a negative impact on pressure stability or backup length. In another example, the screw pitch to screw diameter ratio can be 0.8 to 1.0 to provide a uniform batch rheology without a negative impact on pressure stability or backup length.

According to some of these exemplary embodiments, a screw segment arrangement from upstream to downstream of 160/160 co-bore+2×120/120+120 mm of SCEs+2×120/120 is preferred. SCE refers to Shear Control Elements, these are discussed below, but the functionality of SCEs combined with the high pitch elements is even better than the high pitch elements by themselves. Nevertheless, the high pitch elements alone are improved as compared a conventional pitch.

According to some of these exemplary embodiments, it was found that a screw arrangement of a single section of 160/240 on the co-bore with 120/120 mm upstream was a good balance between improved mixing uniformity and minimized heat generation, providing improved rheology uniformity while not negatively impacting throughput capability. In contrast, when the 160/640 mm configuration was tested the heat generation was significant and the uniformity was not significantly better, if at all, than the preferred configurations. As described above in the efficiency graphs of FIGS. 10, 11, 12, and 13, the 30 to 40% efficiency range is where improved part quality was identified. The combination of 160/240 and 120/120's calculated as a weighted average with respect to isotactic pressure around each element provided a hybrid calculation where the advantages of both pitch and location can maintain the process within or very close to the 30% to 40% optimized region.

According to some of these exemplary embodiments, a kneading screw geometry and application thereof which can be utilized in various combinations to deliver improved shear and thermal uniformity (uniform rheology) of a ceramic extrusion batch is provided. According to some of these embodiments, a kneading element with a shear control element (SCE) geometry is provided to deliver uniform mixing and minimize regions of high shear while still wiping the barrel walls. By maximizing the radius of curvature, for example, an ellipse with a minimum major diameter to minor diameter ratio, the SCE achieves a theoretical minimum peak shear subject to the constraint that the barrel walls are wiped. The elliptical geometry significantly reduces the time during which the clearance between screw and barrel wall is small versus conventional double flight kneading elements. This gives a low peak shear due to a large clearance profile compared to traditional screw elements. Radial wiping of the barrel wall can be achieved due to maintaining the standard clearance at the maximum radius point. Radial mixing takes place due to large open clearances and the non-pitch profile of the SCE.

According to some of these embodiments, specific locations of the SCEs along the shaft and radial orientations of the lobes of the SCEs are provided. Also individual elements can be used to tailor the segments to optimize for a specific situation and desired outcome that may change with batch composition, die geometry, etc. That is, the orientation of individual elements can be modified and the number of elements can be modified to match a given process or composition. This provides flexibility to adapt the design for further optimization.

According to some of these exemplary embodiments, specific locations along the shaft and radial orientation of the lobes can be determined. Preferably, the SCE section is disposed at least partially in the backup length region, and preferably the SCE section is not disposed in the discharge position. A region of the backup length where the SCE section may be disposed is shown in FIG. 14 as "SCE". The SCE arrangement provides partial forward conveyance due to about 90° offset of each lobe (spiral stair case effect) in an embodiment. In other exemplary embodiments each SCE can be disposed at other angles, for example, each SCE can be disposed at an angle of 80° to 100° offset to any adjacent SCE, for example, each SCE can be disposed at an angle of 35° to 55° offset to any adjacent SCE, or even, each SCE is disposed at an angle of 35° to 180° offset to any adjacent SCE. These embodiments provide improved rheology uniformity without dramatically increasing the temperature of the batch or imparting large shear gradients.

Kneading elements of various geometries and radial orientations to perform various functions, mostly in polymer extrusion for distributive or dispersive mixing as well as heat generation for melting polymers have been tried. Many of these designs when tested in ceramic extrusion were found to generate a lot of heat, and/or cause flow defects due to non-uniform mixing. In contrast, advantages of exemplary embodiments of the disclosure include cost reduction, improved extrudate quality, and improved performance attributes. Improved extrudate quality has included improved shape and improved isostatic strength (ISO) of the fired ware. Process stability has resulted in reduced losses due to defects, repeatability of run-to-run performance, and better plant-to-plant consistency, for example, due to standardized screw configuration delivering more uniform flow and die transfers behaving similar from plant to plant.

Figure 17A:
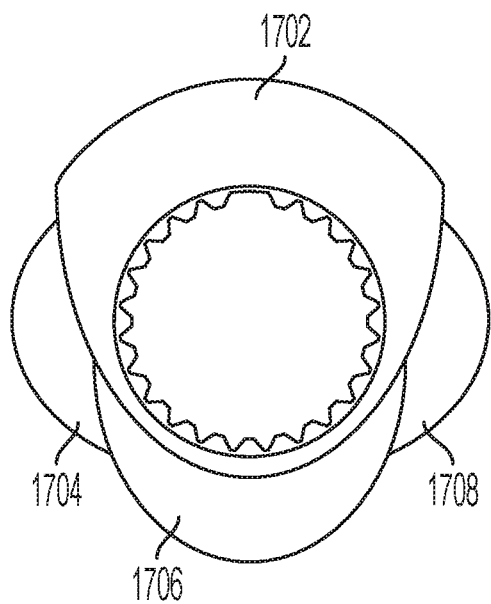
FIG. 17A shows an end profile of a conventional single flight kneading element overlaid on top of three shear control element with single flights with 90° radial offset between elements, according to some exemplary embodiments of the disclosure.
Figure 17B:
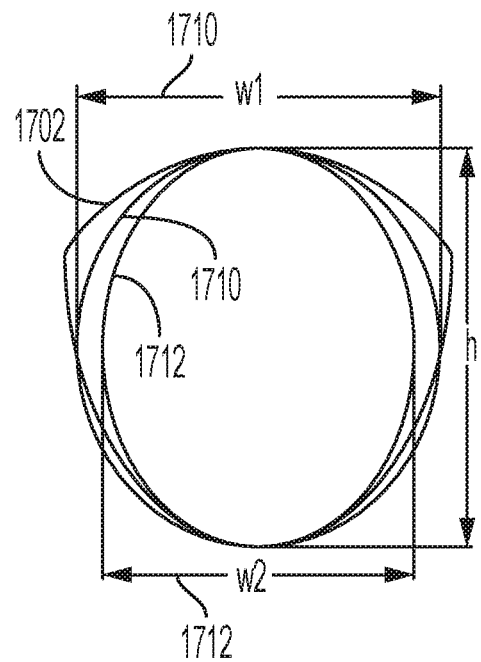
FIG. 17B shows outlines and some dimensions of a conventional single flight profile and two different elliptical designs of shear control elements according to some embodiments of the disclosure.

FIG. 17A shows an end profile of conventional single flight (SF) kneading element 1702 overlaid on top of three SCEs with single flight designs, 1704, 1706, 1708 according to exemplary embodiments of the disclosure with 90° radial offset between elements. FIG. 17B shows outlines and some dimensions of a conventional single flight profile 1702 as compared to two different elliptical designs (Ellipse 1710, Ellipse 1712) for shear control elements (SCEs) according to exemplary embodiments of the disclosure. These elliptical designs differ with respect to the minor diameter. Ellipse 1710 has the largest minor diameter possible to maintain the standard screw clearance during rotation. This elliptical configuration produces the theoretical minimum average shear while still maintaining the ability to wipe the barrel walls because the radius of curvature is minimized. It also significantly reduces the time during which the clearance between the screw element and the barrel waif is small versus conventional kneading elements. Ellipse 1712 has the minimum minor diameter possible while maintaining the standard wall thickness between the root diameter and the inner splines. Ellipse 1712 also produces a minimum average shear while still maintaining the ability to wipe the barrel walls because the radius of curvature is minimized and reduces the time during which the clearance between screw and barrel wall is small versus standard kneading elements. Additional ellipse shaped elements (not shown) having elliptical shapes between Ellipse 1710 and Ellipse 1712, as shown in FIG. 17B are also contemplated exemplary embodiments. Ellipse 1702 and Ellipse 1704 have no shoulder and no flat region. Such an elliptical geometry (without a shoulder and without a flat region) is referred to herein as a continuous closed curve elliptical geometry.

Figure 18:
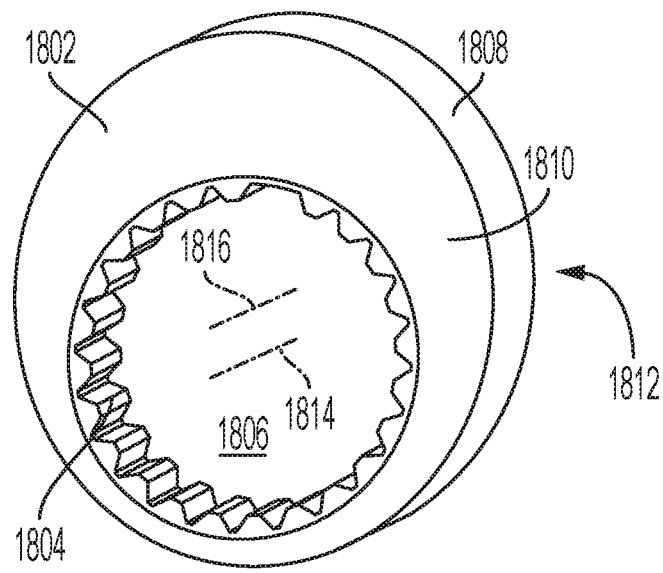
FIG. 18 shows an isometric view of a single shear control element according to one exemplary embodiment.

FIG. 18 shows an isometric view of a single SCE element 1802 comprising the shape of Ellipse 1710. In some embodiments, the shape provides an improved design to minimize peak shear while maintaining clearances between the screw and barrel. The SCE 1802 comprises an inner surface 1804 defining an opening 1806 configured to couple the SCE to a shaft 46, 48. The SCE 1802 also includes a continuous closed curve elliptical outer surface 1808. The SCE 1802 further comprising a front surface 1810 perpendicular to the inner surface 1804 and the outer surface 1808 and a back surface 1812 spaced apart from and parallel to the front surface. The opening 1806 has an axis 1814 that is off-center with respect to a geometric center 1816 of the SCE as viewed in a transverse plane perpendicular to the axis. The geometric center 1816 of the SCE is the average position of all points residing on a plane (e.g., front surface 1810 or back surface 1812) within a profile of the outer surface 1808.

The shaft splined opening 1806 is at one side of the geometric center of the elliptical geometry. This provides the SCE with an eccentric geometry. Thus, the SCE of FIG. 18 comprises a continuous closed curve eccentric elliptical geometry.

The inner surface of the SCE can include a smooth polygonal structure for a polygonal shaft, a splined structure, a keyed structure, or a combination thereof to appropriately couple to a TSM shaft. The SCE can further comprise a continuous closed curve elliptical outer surface, as illustrated in FIGS. 17B and 18. The opening for the shaft is off-center to the elliptical outer surface as viewed in a plane transvers to an axis of the opening. The outer surface defines a single flight of the SCE. The outer surface of the SCE comprises no shoulder and comprises no flat region. An interlocking step can be disposed on at least one of the front surface and the back surface configured to join the SCE to an adjacent element.

Figure 19:
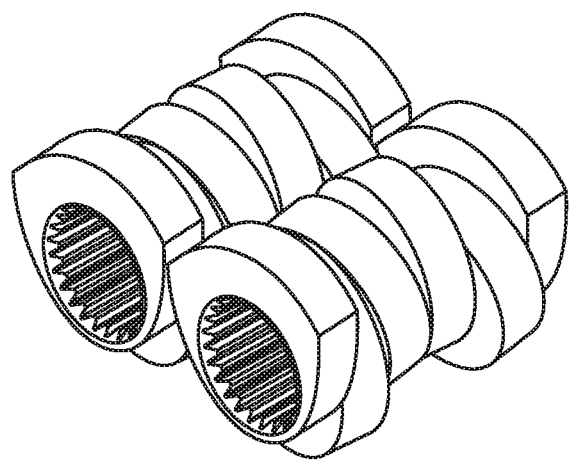
FIG. 19 shows an assembly of four shear control elements with 90° offsets according to some embodiments of the disclosure.
Figure 20:
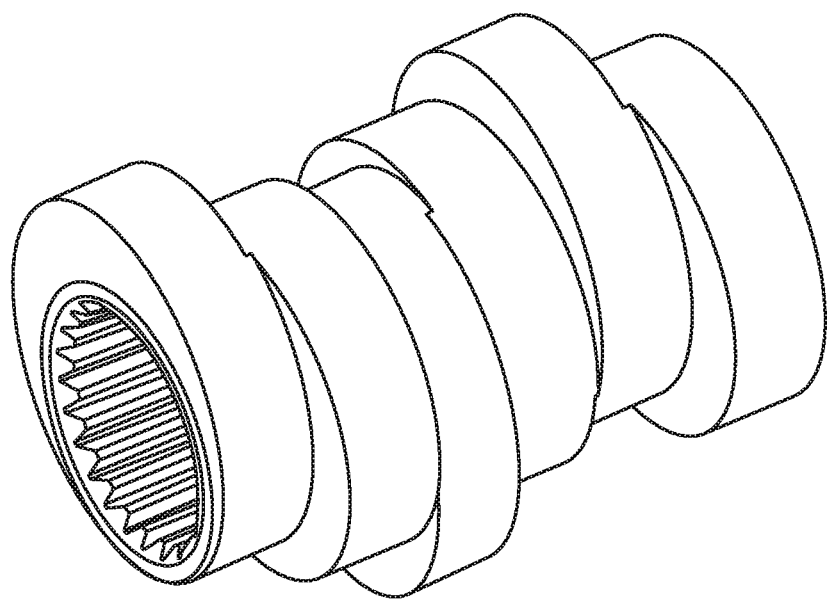
FIG. 20 shows a schematic isometric view of an assembly of six shear control element with 90° offsets according to one exemplary embodiment of the disclosure.

FIG. 19 shows an assembly (e.g. also referred to as a "stack up") of four SCEs with 90° offsets according to exemplary embodiments of the disclosure. The leading and trailing elements have a shoulder that can lead to high peak shear while wiping the barrel walls. FIG. 20 shows a schematic isometric view of an assembly (e.g., a stack up) of six SCEs with 90° offsets. The number of SCEs in such a stack up is not particularly limited, for example, four to eight SCEs can be used. The elements in FIG. 20 comprise the elliptical shape shown in FIG. 18 and provide the theoretical minimum average shear while still maintaining the ability to wipe the barrel walls because the radius of curvature is minimized. It also significantly reduces the time during which the clearance between screw and barrel wall is small versus standard kneading elements.

Figure 21:
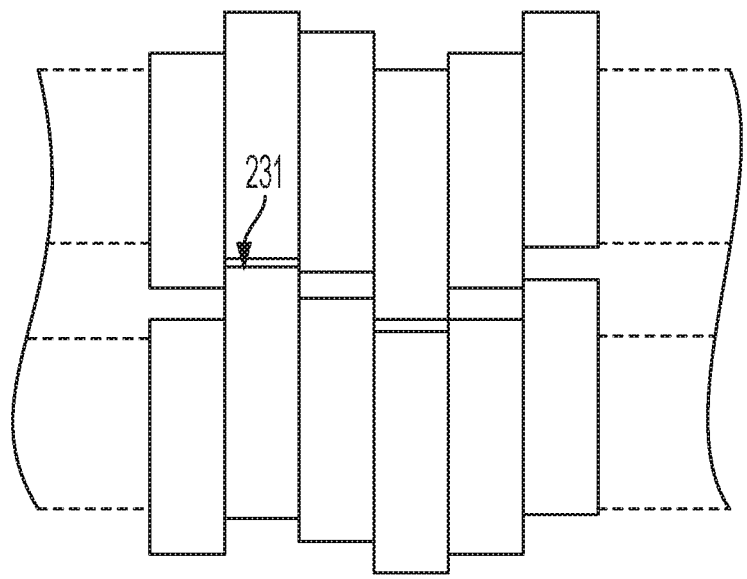
FIG. 21 shows a schematic top view of a shear control element section in a twin screw extruder machine (TSM) according to one exemplary embodiments of the disclosure.

FIG. 21 shows a schematic top view of the SCE section in a TSM. A gap between screws during the time when major diameters of the screws are aligned and the clearance between the screws is tight is indicted at 231. The short time that this clearance is small minimizes the overall average shear experienced by the batch as it is flowing through this section.

According to exemplary embodiments of the disclosure, the SCEs impart uniform mixing while minimizing average shear, and also provide flexibility to modify mixing strength by selecting the orientation offset between elements, as well as the number of elements and the location within the extruder. The position along the shaft and offset directly impact the amount of shear mixing and heat that is generated as a result of the mixing. Therefore, the chosen number of elements and orientation can be tailored to match the specific need of a given batch rheology or process output.

Figure 22:
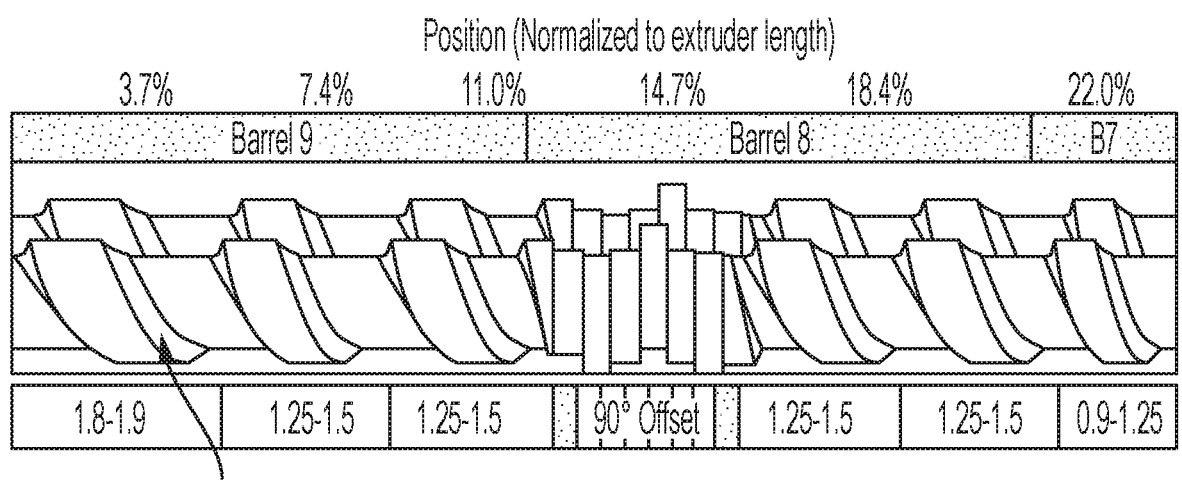
FIG. 22 is a schematic of an exemplary embodiment of the disclosure comprising, from left to right, a 160/160 single flight (SF) coupled to two 120/120 single flights to a transition element, coupled to six SCEs at 90° s to a transition element, coupled to two 120/120 single flights, coupled to a standard configuration 80/80 single flight, according to one embodiment of the disclosure.

One exemplary embodiment of the disclosure comprises, from left to right, a 160/160 single flight (SF) coupled to two 120/120 single flights (or one 120/240 single flight) to a transition element, coupled to six SCEs at 90° to a transition element, coupled to two 120/120 single flights, coupled to a standard configuration 80/80 single flight as shown schematically in FIG. 22. When normalized for TSM size, the pump and mix segment 2202 can include 1.8-1.9 pitch/diameter elements and 1.25-1.5 pitch/diameter elements as illustrated in FIG. 22.

The SCEs were disposed at the end of barrel 8 in FIG. 22 because, in this particular embodiment of the extruder (with a low wall drag batch composition and typical thin wall die), that is the location within the barrel where the backup length begins (e.g., a point of zero pressure). In this embodiment, the location was determined to be the place to locate the SCEs to minimize heat generation, while maximizing mixing potential as close as possible to the end of the extruder. The mixing of batch close to the end of the extruder helps maintain uniformity of the batch in this section. However, mixing under pressure in a downstream portion of back up length region may generate unnecessary frictional heating, while not improving the overall uniformity. It should be noted, however, that this screw configuration was also tested on high wall drag batch compositions where the backup length was through this region and into barrel 7. This likely generated more heat per revolution than with the low wall drag batch composition, but it was not detrimental to the process and quality improvements were maintained.

The preferred embodiment comprises 90° offset between adjacent SCE elliptical elements providing forward batch conveying. This configuration provided some pumping ability due to spiral staircase effect and, therefore, generated less heat than 180° offset elements that had neutral conveying.

Figure 23:
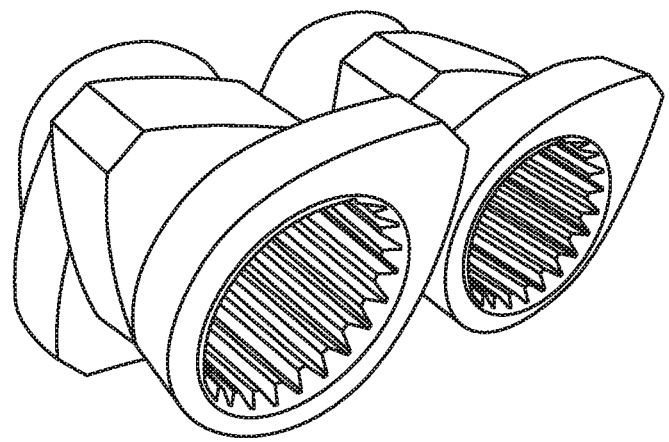
FIG. 23 shows single flight kneading elements with narrow tip angles and different staggering angles relative to one another in a positive or reverse conveying design.

SCEs according to exemplary embodiments of the disclosure have lower average shear than single flights with a flat region because of a longer high shear at the flat region between the barrel wall and the lobe and because of a lower average shear between lobe to lobe (average in terms of the shear imparted to the batch during a complete revolution of the element in the barrel). Even single flight kneading elements with narrow tip angles as shown, for example, in FIG. 23, with different staggering angles of the kneading discs relative to one another in positive or reverse conveying design, higher average shear is generated in the batch than with the SCEs according to exemplary embodiments of the disclosure. The SCEs have a lower average shear than the single-flighted kneading elements because of the gradual radius change, as shown in FIGS. 17B and 18 (as compared to the kneading element with a "flat" lobe, as shown FIG. 23).

Figure 24:
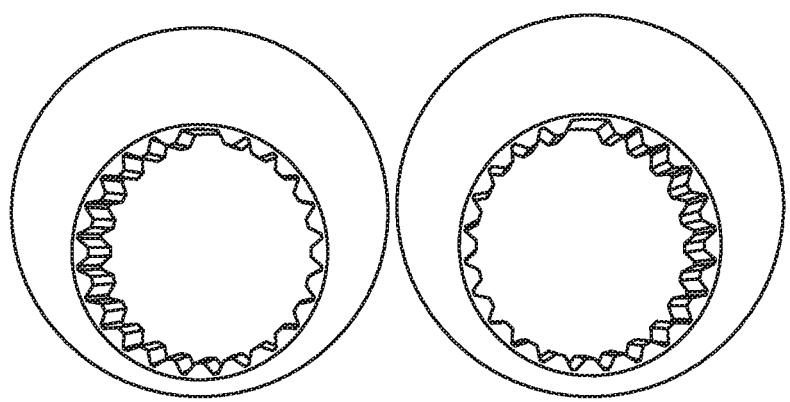
FIG. 24 shows eccentric elements that are unable to wipe batch along barrel walls due to diameter constraints and that have low peak shear due to their round profiles with no distinct points or lobes.

On the other hand, circular eccentric discs, such as illustrated in FIG. 24 are unable to wipe the batch along the barrel walls due to diameter constraints. The discs have very low peak shear due to the round profile with no distinct points or lobes and the maximum shear point is between the two screws where the clearance gap is narrowest. Eccentric discs are round cylindrical discs arranged eccentrically relative to the screw shaft with a tapering gap into which the batch is drawn and elongated by the rotating action. However, elongational flow is not restricted in axial direction so that part of the product may escape from the elongational flow into the up-stream and down-stream screw channels.

SCEs according to exemplary embodiments of the disclosure have slightly higher peak shear compared to eccentric discs due to the elongated major axis diameter of the ellipse, but will be able to wipe the barrel wall to prevent batch from stagnating at the wall and becoming stuck on the cold surface. The two diameters of the ellipse were selected such that the large diameter would provide the standard clearance between the screw and barrel wall and the small diameter is as large as possible to allow for standard clearance between the two screws during screw rotation.

Figure 25A:
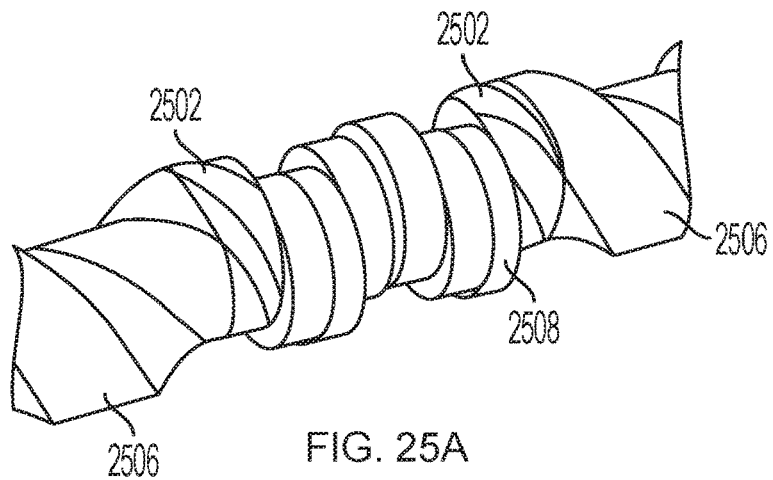
FIGS. 25A, 25B, and 25C show a transition element according to some embodiments of the disclosure.
Figure 25B:
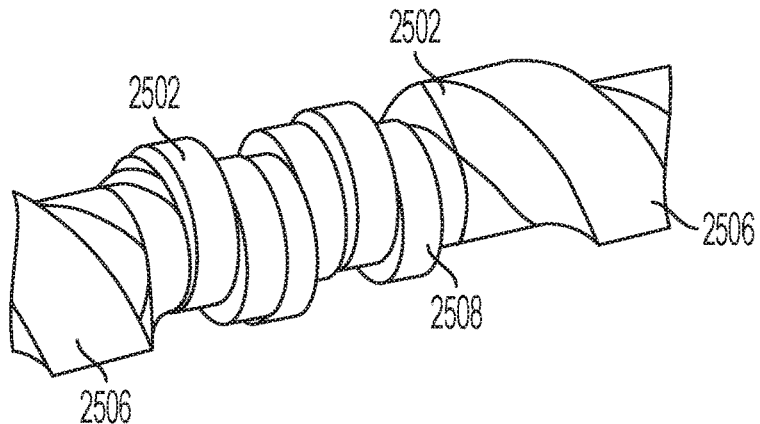
Figure 25C:
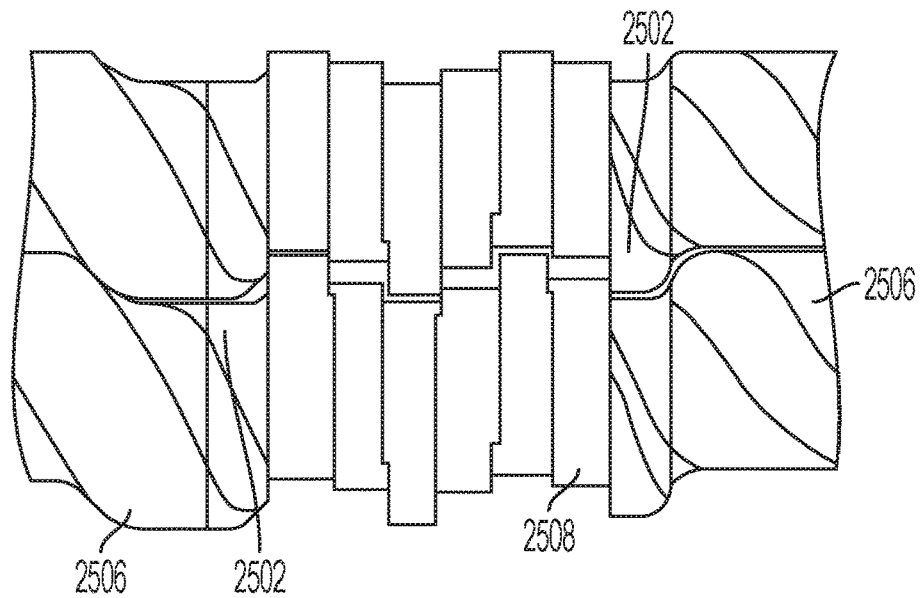

A transition element 2502 shown in FIGS. 25A, 25B, and 25C can be utilized according to exemplary embodiments to provide an efficient and smooth transition from the SCE 2508 to the pump and mix screw element 2506. Such a transition element 2502 can morph to an SCE on one side and a pump and mix element on the other side. Such a transition element, for example, can be 75% a pump and mix element and 25% a SCE. For example, the transition element can be 50% a pump and mix element and 50% a SCE, or the transition element can be 25% a pump and mix element and 75% a SCE. In the illustrated embodiment, in FIGS. 25A, 25B, and 25C, the transition element 2502 is 75% a pump and mix element and 25% a SCE.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A segment for a ceramic batch screw extruder machine, the segment comprising:
    a first pump and mix screw element and a second pump and mix screw element, wherein each of the first and the second pump and mix screw elements comprises a pitch, a diameter, and a pitch to diameter ratio of 0.91 to 2.6;
    a kneading element disposed between the first pump and mix screw element and the second pump and mix screw element;

wherein the pitch to diameter ratio of either or both of the first pump and mix screw element and the second pump and mix screw element changes along a length of the segment while remaining within a range of 0.91 to 2.6; and wherein a first transition element transitions the first pump and mix screw element to the kneading element and a second transition element transitions the kneading element to the second pump and mix screw element.

2. The segment of claim 1, wherein either or both of the first pump and mix screw element and the second pump and mix screw element comprises a pitch to diameter ratio of 0.95 to 2.6.

3. The segment of claim 1, wherein either or both of the first pump and mix screw element and the second pump and mix screw element comprises a pitch to diameter ratio of 1.2 to 2.6.

4. The segment of claim 1, wherein either or both of the first pump and mix screw element and the second pump and mix screw element are a single flight element.

5. The segment of claim 1, wherein the first pump and mix screw element and the second pump and mix screw element comprise the same pitch to diameter ratio.

6. The segment of claim 1, wherein the first pump and mix screw element comprises a different pitch to diameter ratio than the second pump and mix screw element.

7. A ceramic batch screw extruder machine, the machine comprising:
at least one barrel defining an extruder length;
a shaft disposed at least partially within the at least one barrel;
a segment disposed along the shaft and the segment comprising at least one pump and mix screw element, wherein the pump and mix screw element comprises a pitch, a diameter, and a pitch to diameter ratio of 0.91 to 2.6;
wherein the pitch to diameter ratio of the pump and mix screw element changes along a length of the segment while remaining within a range of 0.91 to 2.6; and
wherein the length of the segment along which the pitch to diameter ratio changes extends through a backup length region of the extruder, the backup length region of the extruder comprising from about 10% to about 45% of the extruder length.

8. The machine of claim 7, further comprising:
at least one kneading element disposed on the shaft downstream of the at least one pump and mix screw element.

9. The machine of claim 7, further comprising:
at least one kneading element disposed on the shaft downstream of the at least one pump and mix screw elements,
wherein the at least one kneading element comprises a single lobe continuous closed curve elliptical geometry.

10. The machine of claim 9, wherein the at least one kneading element comprises a plurality of kneading elements.

11. The machine of claim 7, further comprising:
at least one kneading element disposed on the shaft,
wherein the at least one kneading element comprises a single lobe continuous closed curve eccentric elliptical geometry,
wherein the at least one pump and mix screw element comprises a plurality of pump and mix screw elements,
wherein a first portion of the plurality of pump and mix screw elements are disposed upstream of the at least one kneading element and a second portion of the plurality of pump and mix screw elements are disposed downstream of the at least one kneading element.

12. The machine of claim 11, wherein the at least one kneading element comprises a plurality of kneading elements,
wherein each kneading element is disposed at an angle of 35° to 180° offset to any adjacent kneading element.

13. The machine of claim 11, wherein the at least one kneading element comprises four to eight kneading elements.

14. The machine of claim 11, wherein (i) the ceramic batch screw extruder machine comprises a 75 to 100 mm extruder diameter, (ii) the first portion of the plurality of pump and mix screw elements comprises at least one of 120 mm pitch and 160 mm pitch elements, and (iii) the second portion of the plurality of pump and mix screw elements comprises at least one of 120 mm and 160 mm pitch elements.

15. The machine of claim 11, wherein (i) the ceramic batch screw extruder machine comprises a 100 to 150 mm extruder diameter, (ii) the first portion of the plurality of pump and mix screw elements comprises at least one of 180 mm pitch and 240 mm pitch elements, and (iii) the second portion of the plurality of pump and mix screw elements comprises at least one of 180 mm and 240 mm pitch elements.

16. The machine of claim 11, wherein (i) the ceramic batch screw extruder machine comprises a 100 to 150 mm extruder diameter, (ii) the first portion of the plurality of pump and mix screw elements comprises at least one of 240 mm pitch and 320 mm pitch elements, and (iii) the second portion of the plurality of pump and mix screw elements comprises at least one of 240 mm and 320 mm pitch elements.

17. The machine of claim 11, further comprising at least one 80 mm pitch element upstream of the first portion of the plurality of pump and mix screw elements.

* * * * *